United States Patent
Kirkpatrick et al.

[11] Patent Number: 5,903,804
[45] Date of Patent: May 11, 1999

[54] PRINTER AND/OR SCANNER AND/OR COPIER USING A FIELD EMISSION ARRAY

[75] Inventors: Douglas Andrew Kirkpatrick, Great Falls, Va.; Craig Jeffrey Mathias, 7 Whippoorwill La., Ashland, Mass. 01721; Adam Thomas Drobot, Annandale, Va.

[73] Assignees: Science Applications International Corporation, San Diego, Calif.; Craig Jeffrey Mathias, Ashland, Mass.

[21] Appl. No.: 08/724,507

[22] Filed: Sep. 30, 1996

[51] Int. Cl.[6] .................................. G03G 15/00
[52] U.S. Cl. .............. 399/154; 358/296; 347/120; 347/159; 313/309
[58] Field of Search .................. 399/173, 148, 399/130, 154; 358/296; 347/112, 120, 128, 159, 162; 313/309

[56] References Cited

U.S. PATENT DOCUMENTS

| | | | |
|---|---|---|---|
| 3,725,950 | 4/1973 | Lamb | 346/74 ES |
| 4,145,635 | 3/1979 | Tuck | 315/5.39 |
| 4,721,967 | 1/1988 | Roche | 346/110 |
| 4,737,805 | 4/1988 | Weisfield et al. | 346/159 |
| 4,789,959 | 12/1988 | Marks | 250/492.2 |
| 4,853,719 | 8/1989 | Reale | 346/155 |
| 4,899,186 | 2/1990 | Walcott | 346/159 |
| 5,070,467 | 12/1991 | Todome | 395/166 |
| 5,138,220 | 8/1992 | Kirkpatrick | 313/309 |
| 5,166,709 | 11/1992 | Kubelik | 346/155 |
| 5,166,739 | 11/1992 | Katsuki et al. | 355/319 |
| 5,237,180 | 8/1993 | Anagnostopoulos et al. | 250/423 F |
| 5,402,157 | 3/1995 | Nagato et al. | 347/122 |
| 5,489,933 | 2/1996 | Betsui et al. | 347/120 |
| 5,495,143 | 2/1996 | Lengyel et al. | 313/574 |
| 5,500,572 | 3/1996 | Anagnostopoulos et al. | 315/169.1 |
| 5,534,743 | 7/1996 | Jones et al. | 313/309 |

FOREIGN PATENT DOCUMENTS

| | | |
|---|---|---|
| 2 524 166 | 9/1983 | France . |
| 1 511 198 | 5/1978 | United Kingdom . |
| 92/14992 | 9/1992 | WIPO . |
| WO 92/20087 | 11/1992 | WIPO . |
| WO 95/26607 | 10/1995 | WIPO . |

OTHER PUBLICATIONS

J. J. Hickman et al., "Surface Composition of Si–TaSi$_2$ Eutectic Cathodes and its Effect on Vacuum Field Emission", Appl. Phys., vol. 61, No. 21, (Nov. 1992), pp. 2518–2520.

D. A. Kirkpatrick et al., "Analysis of Field Emission from Three–Dimensional Structures", Appl. Phys., vol. 60, No. 17, (Apr. 1992), pp. 2065–2067.

D. A. Kirkpatrick et al., "Demonstration of Vacuum Field Emission from a Self–Assembling Biomolecular Microstructure Composite", Appl. Phys. Lett., vol. 60, No. 13, (Mar. 1992), pp. 1556–1558.

D. A. Kirkpatrick et al., "Vacuum Field Emission from a Si–TaSi$_2$ Semiconductor–Metal Eutectic Composite", App. Phys. Lett., vol. 59, No. 17, (Oct. 1991), pp. 2094–2096.

*Primary Examiner*—Richard Moses
*Attorney, Agent, or Firm*—Foley & Lardner

[57] ABSTRACT

A method, device and system for utilizing a pixelized ungated linear array of field emitters and an integrated electrode-media surface to either detect the presence of charge on the surface in a given two-dimensional pattern, or to deposit charge on the surface in a desired two-dimensional pattern. The methods, devices and systems disclosed are particularly useful in the arts of printing, scanning and copying. In one embodiment designed for printing, a pixelized surface may be utilized to receive a charge pattern from the ungated linear field emitter array. In one embodiment designed for scanning, a pixelized transfer sheet may be utilized to transfer a two-dimensional charge pattern from a photostatic surface thereto for sensing and detection by the ungated linear field emitter array.

106 Claims, 13 Drawing Sheets

PRINTER AND/OR SCANNER AND/OR COPIER USING A FIELD EMISSION ARRAY

BACKGROUND OF THE INVENTION

The invention relates to the fields of printing, scanning and copying, and more particularly to printing, scanning and copying using field emitter arrays.

Current printing processors are inherently serial in nature and rely on the use of light, typically by means of forming an optical image on a light sensitive drum to effect their printing operation. One reference, U.S. Pat. No. 5,166,709, does disclose a printer which utilizes an array of charge deposition structures which deposit an electrostatic latent image on an imaging member. However, this reference is specifically designed for gated electrode operations and utilizes a driving circuit to operate its field emission devices in a voltage range lying below the Paschen curve. The reference clarifies that for gated structures, operation below the Paschen curve is essential in order to prevent shorting of the printing signal between the cathode and the gate.

Referring to the scanning arts, conventional scanners detect patterned information in one of two ways. One method uses CCD based scanners comprising a CCD array for gathering reflected light, and generating a signal representative thereof, and then digitizing that signal. This CCD array is smaller than one scanned line, so that the scanning is physically sequential, not only within the document, but also within the one scanned line.

Other scanning processors are designed around laser scanning, which uses the reflectance of a laser beam from a target surface to create a digital stream of information. The laser process is faster than the CCD process, but is also more expensive. Both of these techniques are serial in nature.

OBJECTS OF THE INVENTION

It is an object of the present invention to replace the optical scanning component required in a typical printing process.

It is a further object of the present invention to provide an inherently parallel process for printing and scanning operations.

It is yet a further object of the present invention to provide easily insertable printing and scanning functionality into existing Xerographic equipment.

It is yet a further object of the present invention to increase the scan rate in a scanner by at least a factor of 10.

It is yet a further object of the present invention to provide printing, copying, and scanning functionality in the same device.

Other objects, advantages, and novel features of the present invention will become apparent from the detailed description of the invention, which follows the summary.

SUMMARY OF THE INVENTION

Briefly, the above and other objects are realized in the configurations for pattern transfer, and the configurations for charge distribution sensing disclosed and claimed herein. In some configurations, the invention will take the form of a printer, a scanner, a copier, or combinations thereof.

In a first embodiment of the present invention, there is disclosed a pattern transfer device including a pixel electrode for receiving and storing a charge, an ungated field emitter array for depositing charge on the pixel in accordance with a control signal, and a driver circuit for driving the field emitter array to cause an electrical discharge across the gap between the field emitter array and the pixel in accordance with a control signal. In a preferred embodiment, this field emitter array may be operated at about approximately atmospheric pressure. Likewise, in a preferred embodiment, the ungated field emitter array may be composed of a semiconductor-metal composite microstructure including an array of rod-like tips of tantalum disilicide protruding from a top surface of a semiconductor substrate, which typically may be silicon. In a preferred embodiment, the pixel may comprise a pixelized transfer sheet or a pixelized drum. In one embodiment, the pixelized transfer sheet may comprise a plurality of pixels disposed on a first surface of the sheet and electrically connected to aligned metal dots on an opposite surface of the sheet. Each individual pixel may be comprised of a conductive dot surrounded by insulating material.

The present invention further comprises a method of pattern transfer comprising the steps of energizing a gap between an ungated field emitter array and a pixel at a voltage to cause an electrical discharge across the gap in accordance with a control signal to cause the field emitter array to emit electrons, and the step of receiving and storing the electrons at the pixel.

In yet a further embodiment of the present invention, there is disclosed a device for creating a patterned charge distribution comprising a surface for receiving and storing charge in a two-dimensional pattern thereon; an ungated linear array of field emitters that is pixelized with a linear array of pixel contacts connected thereto so that each contact energizes a different set of field emitters in the linear array of field emitters, and means for creating a relative closely-proximate movement between the linear array of field emitters and the surface so that the two-dimensional pattern is scanned. This embodiment further comprises a driver circuit for applying voltage, to cause electrical discharges across the gap between the field emitters and the surface, to selected ones of the pixel contacts as the surface and the linear array move relative to one another to cause charge to be deposited on the surface in the shape of a two-dimensional pattern.

In a further refinement of this configuration, the surface for receiving and storing charge may be both charge-sensitive and photosensitive, and the configuration may further include a toner dispenser for depositing toner onto the surface in accordance with the two-dimensional pattern of deposited charge, and means for bringing a material to be printed into contact with the surface to convert the two-dimensional toner pattern to a visible image on the material.

In a yet further embodiment of the present invention, the surface may be pixelized, with each pixel comprising a conductive dot surrounded by insulating material. The configuration may further include a toner dispenser for depositing toner onto the surface so that the toner is retained on the surface in accordance with the two-dimensional pattern of charge deposited thereon, and means for bringing a material to be printed into contact with the two-dimensional pattern of toner on the surface to transfer the two-dimensional pattern onto the material.

In yet a further refinement of this configuration, the surface may be pixelized on one surface thereof, with each pixel comprising a conductive dot surrounded by insulating material. Additionally, the means for creating relative movement may be configured to move the surface across the linear array of field emitters.

In a further embodiment of the present invention, there is disclosed a device for sensing charge distribution on a surface comprising a photostatic surface for storing a two-dimensional charge pattern, a linear array of field emitters, means for creating relative closely-proximate movement between the linear array of field emitters and the two-dimensional pattern, and a sampling circuit for sampling the linear array of field emitters during the relative movement between the linear array of field emitters and the two-dimensional pattern so that the two-dimensional pattern is effectively sampled and a sampling signal is generated that is representative thereof. This configuration may further include a storage device for storing the sampling signal that is representative of the two-dimensional charge pattern. In a preferred embodiment of this configuration, the field emitters in the linear array are ungated and are biased by the sampling circuit so that the two-dimensional charge pattern causes selected field emitters to emit electrons in an electrical discharge during the sampling process. Likewise, in a preferred embodiment the linear array of field emitters is pixelized with a linear array of pixel contacts connected thereto so that each contact connects to a different set of field emitters in the linear array. The preferred embodiment may include a conversion circuit for converting the sampling signal into digital data and then providing the digital data to the storage device. In a preferred embodiment, the linear array of field emitters may comprise an array of rod-like tips of tantalum disilicide protruding from a top surface of a silicon substrate. Likewise, it is preferred that the linear array of field emitters be disposed in a housing at about atmospheric pressure. In one embodiment of this configuration, the means for creating relative movement may comprise a transfer sheet disposed relative to the photostatic surface for replicating the two-dimensional pattern thereon, means for transferring the two-dimensional pattern from the photostatic surface to the transfer sheet, and means for creating relative closely-proximate movement between the linear array of field emitters and the two-dimensional pattern on the transfer sheet. In a preferred embodiment, this transfer sheet may be pixelized, with each pixel comprising a conductive dot surrounded by insulating material.

In a different embodiment of the foregoing configuration, the means for creating relative movement may include means for moving the photostatic surface directly across the linear array of field emitters.

The foregoing configuration of the present invention may further include a driver circuit that comprises a storage capacitance and a fire-enable switch for each field emitter pixel for charging its respective field emitter pixel through the fire-enable switch in accordance with a control signal.

In yet a further aspect of the present invention, there is disclosed a method and a device for sensing charge distribution on a surface comprising a pixelized surface, with the pixels on the surface capable of storing a two-dimensional charge pattern; a linear array of field emitters disposed across the pixelized surface for sampling the charge on the surface and generating a sampling signal in response thereto; and means for creating relative closely-proximate movement between the linear array of field emitters and the pixelized surface. This configuration further includes a sampling circuit for sampling the linear array of field emitters during the relative movement between the linear array of field emitters and the surface so that a two-dimensional charge pattern stored on the pixelized surface is sampled and a sampling signal is generated that is representative thereof, and a storage device for storing the sampling signal that is representative of the two-dimensional pattern. In a preferred embodiment of this configuration, the field emitters in the linear array are ungated and are biased by the sampling circuit so that the two-dimensional charge pattern causes selected field emitters to emit electrons in an electrical discharge during the sampling process.

In yet a further embodiment of the present invention, there is disclosed a unitary system comprising a first surface for receiving and storing thereon charge representing a first two-dimensional pattern; an ungated first linear array of field emitters that is pixelized with a linear array of pixel contacts connected thereto so that each contact energizes a different set of field emitters in the first linear array of field emitters; and first means for creating relative closely-proximate movement between the first linear array of field emitters and the first surface. This configuration further includes a first driver circuit for applying voltages to cause electrical discharges across the gap between the field emitters and the first surface, to selected ones of the pixel contacts as the surface and the linear array move relative to one another to cause charge to be deposited on the first surface in the shape of the first two-dimensional pattern. This configuration further includes a second surface for receiving and storing a second two-dimensional pattern thereon, a second linear array of field emitters, a second means for creating relative closely-proximate movement between the second linear array of field emitters and the second two-dimensional pattern. The system further includes a sampling circuit for sampling the second linear array of field emitters during the relative movement between the second linear array of field emitters and the second two-dimensional pattern so that the second two-dimensional pattern is sampled and a sampling signal generated that is representative thereof, and a storage device for storing the sampling signal that is representative of the second two-dimensional pattern.

In yet a further embodiment of the present invention, there is disclosed a system comprising a surface for receiving and storing charge in a two-dimensional pattern; an ungated linear array of field emitters that is pixelized with a linear array of pixel contacts connected thereto so that each contact energizes a different set of field emitters in the linear array of field emitters; and means for creating relative closely-proximate movement between the linear array of field emitters and the surface. The system further includes a driver circuit for operation in a first mode to apply voltage, to cause an electrical discharge across the gap between the field emitters and the surface, to selected ones of the pixel contacts as the surface and the linear array move relative to one another to cause charge to be deposited on the surface in the shape of a first two-dimensional pattern. The system further includes a sampling circuit for operation in a second mode for sampling the linear array of field emitters during the relative movement between the linear array of field emitters and the surface so that a second two-dimensional charge pattern stored on the surface is sampled and a sampling signal is generated that is representative thereof. The system also includes a storage device operational in the second mode for storing the sampling signal that is representative of the second two-dimensional charge pattern, and a switch for switching system operation between the first mode and the second mode.

The present invention further comprises a specially designed driving and sampling circuit for use in driving and sampling the activity of the field emitter array.

The present invention also encompasses a unique pixelized transfer sheet for use in the herein defined system.

DETAILED DESCRIPTION OF THE PREFERRED EMBODIMENTS

Figure 1:
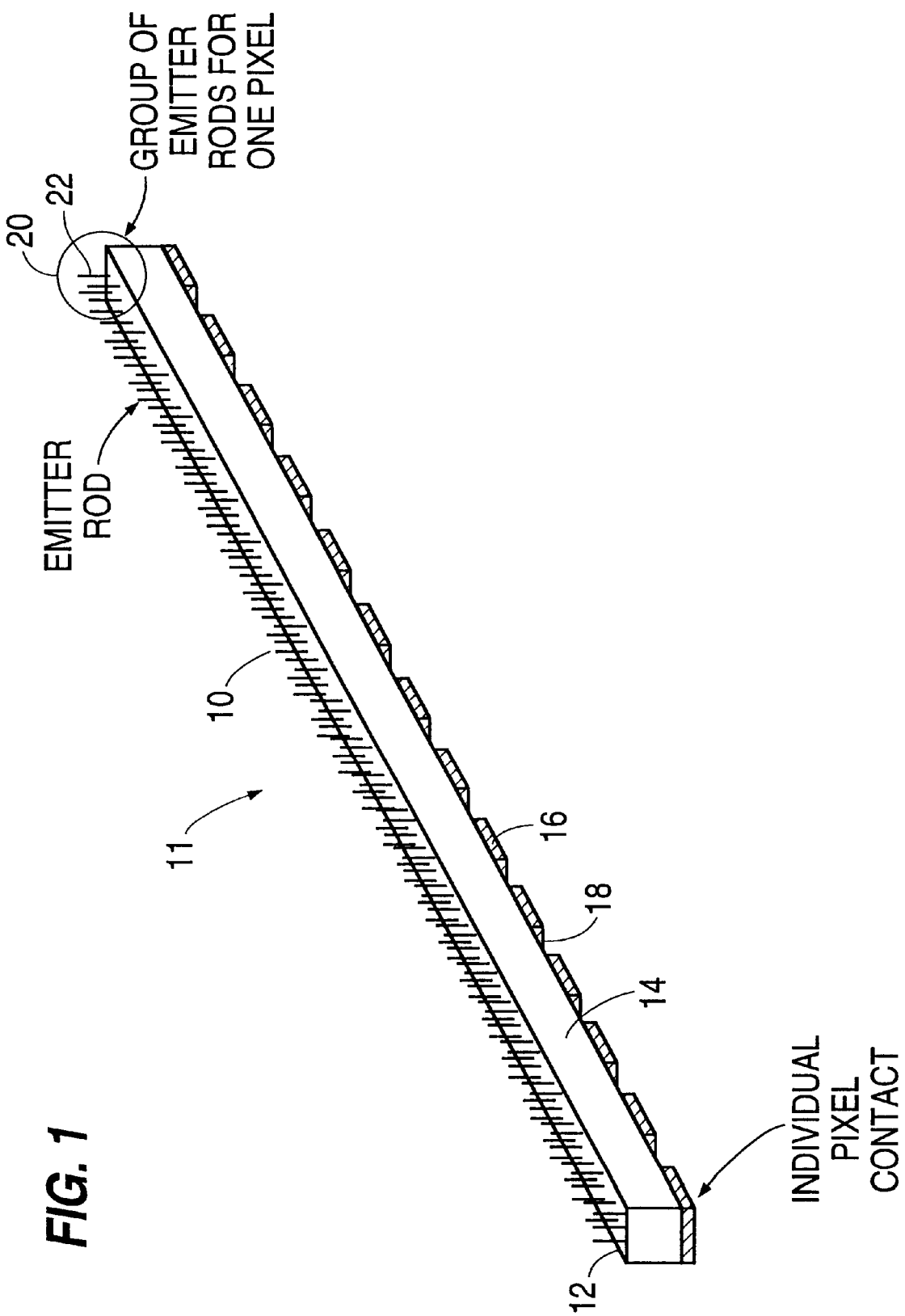
FIG. 1 is a schematic diagram of a linear array of field emitters that may be utilized in the present invention.

The present invention discloses methods, devices, and systems for utilizing the unique character of a field emission array (FEA), to achieve an array of electrostatic elements that can be used to either detect the presence of charge on a surface in a given pattern, or to deposit charge on a surface in some desired pattern. This dual functionality can be used in concert with a standard Xerography process to print a document from stored digital data, or it can be used in the reverse function to sense the electrostatic image of a document on the Xerography drum and convert this image to a digital signal for subsequent storage. In one embodiment of this invention, a device is provided to be retrofitted to a high speed photocopier wherein a linear array of field emitter elements is used to either read charge from the drum in a scanner mode, or to deposit charge onto the drum in a printer mode. The invention comprises fabricating a linear strip of field emitters that can be grouped in pixels of scale size as small as 10 micrometers using existing manufacturing techniques. Developmental manufacturing techniques will allow pixels of scale size as small as 1 micrometer and below.

With specific reference to the operation of field emitters, it is known that field emission processes use a very high electric field stress at the surface of a cathode material to directly liberate electrons from the cathode through quantum tunneling. This process is in direct contrast to thermionic emission or secondary emission processes. The field emission process is sometimes referred to as quantum field emission because of its quantum tunneling aspect. The external fields required for the quantum tunneling phenomena are on the order of $10^6$ to $10^8$ V/cm, depending on the desired emission current density and the work function of the cathode material. Such large external fields are normally only achieved in resonant radio-frequency accelerator cavities, or near structures with very sharp surface features that dramatically enhance the average applied field. A type of cathode has been developed which exploits this latter field enhancement design by providing a high density array of microscopic sharp tips in which each tip acts as a field emitter source of electrons. Such cathodes are typically referred to as field emitter (or emission) arrays.

Field emitter arrays have been fabricated from a wide variety of emitter materials including silicon, molybdenum, gallium-arsenide, diamond, and tantalum-disilicide. All of these field emitter arrays achieve the large fields necessary for field emission through the use of microscopic structures with sharp surface features such as pointed cones or wedges. One class of these field emitter arrays also employ a gate electrode that is positioned in close proximity to the emitting cone or wedge; the apex of the cone or wedge is typically approximately centered in an aperture in the gate electrode. The close proximity (typ.<1 micron) of the gate electrode allows quantum field emission from the tip to occur for relatively modest tip-to-gate voltage differences (typ. 50–500 V). Most of the gated field emitter array research has focused on their use in vacuum micro-electronic devices, and most gated field emitter arrays require sensitive treatment in ultra-high vacuum systems with pressures of approximately $10^{-8}$ Torr.

A second class of field emitter arrays forsakes the use of a proximate gate electrode and instead attempts to optimize the performance of the field emitter structure itself. The research in ungated field emitter arrays has focused on their use in more conventional applications for advanced cathode technology, including accelerators, conventional vacuum tubes, gas discharge lighting, ion sources, and materials processing. General background information and detailed technical data on ungated field emitter arrays having microscopic emitter elements are set forth in U.S. Pat. No. 5,138,220, entitled "Field Emission Cathode of Bio-Molecular or Semiconductor-Metal Eutectic Composite Microstructures" issued on Aug. 11, 1992 to Douglas A. Kirkpatrick; U.S. Pat. No. 5,495,143, entitled "Improved Gas Discharge Device Having A Field Emitter Array With Microscopic Emitter Elements," issued on Feb. 27, 1996 to J. Michael Lengyel et al; "Surface Composition of Si—TaSi$_2$ Eutectic Cathodes and It's Effect on Vacuum Field Emission", Applied Physics letters, James J. Hickman et al., Vol. 61, No. 21, Nov. 23, 1992, page 2518; "Analysis of Field Emission From 3-Dimensional Structures", Applied Physics Letters, D. A. Kirkpatrick et al., Vol. 60, No. 17, Apr. 27, 1992, page 2065; "Demonstration of Vacuum Field Emission From a Self-Assembling Biomolecular Microstructure Composite", Applied Physics Letters, Vol. 60, No. 13, Mar. 30, 1992, page 1556; and "Vacuum Field Emission From a Si—TaSi$_2$ Semiconductor-Metal Eutectic Composite", Applied Physics Letters, Vol. 59, No. 17, Oct. 21, 1991, page 2094. The contents of these documents are incorporated herein by reference.

It should be noted in the description that follows that none of the figures are drawn to scale and the various items shown therein are not in their exact proportions for ease of illustration.

Referring now to FIG. 1, there is shown a schematic diagram of a linear strip of field emitters that may be used in the present inventive method, device and system. In the figure there is shown a metal composite microstructure including an array of rod-like emitter tips or emitter rods 10 protruding from a top surface 12 of a strip of composite eutectic material 14. The field emitter rods may be fabricated from a variety of emitter materials including silicon, molybdenum, gallium-arsenide, diamond, and tantalum-disilicide. Likewise, there are a variety of materials which may be used to form the substrate 14, including silicon, glass, and substrates with patterned microelectrodes already deposited on their surfaces. However, in a preferred embodiment, the rod-like emitter tips are made of tantalum disilicide, the matrix is comprised of a silicon substrate, and this combination is derived from the semiconductor-metal eutectic Si—TaSi$_2$ composite where the silicon matrix is single crystal and the TaSi$_2$ rods are aligned in the direction of solidification of the eutectic composite crystal. It has been found that a device made of the foregoing material may be effectively utilized at approximately atmospheric pressure. The linear array of field emitters 10 may be pixelized with a linear array of pixels 20, with each pixel 20 having a contact 16 connected thereto, with each contact 16 energizing a different set 22 of field emitters in the linear array of field emitters 10. In the embodiment shown in FIG. 1, the linear array of pixel contacts 16 are simply formed on the back surface 18 of the substrate 14.

Each pixel 20 in the linear array of field emitters 10 comprises its aforementioned set of field emitter tips 22, where the number of tips in a pixel 20 is determined either by a mask procedure in the case of microlithographically defined FEAs, or by the density of emitter rods per unit area in the eutectic composite crystal boule in the case of eutectic composite FEAs. A typical number of tips for a pixel is on the order of 5–20. Because the instant invention is a charge-driven device, its performance is not affected by the number of FEA tips in a pixel so long as there is at least one FEA tip per pixel. Measurements of the Si—TaSi$_2$ FEAs have demonstrated sustainable average tip currents of greater than 40 microamperes per tip; the deposition of 1 pC of charge in 1 microsecond from a single tip equates to only 1 microampere per tip. Further, by way of example, to implement a system with a desired DPI resolution of 300, the pixel size should be on the order of 50 micrometers diameter with a pixel-center to pixel-center distance of approximately 80 micrometers. In the case of the preferred embodiment of the present invention where the FEAs are implemented with Si—TaSi$_2$, Schottky barriers may be utilized between dissimilar emitter and matrix substrate materials to prevent cross-talk between pixels 20 in the array 11.

As is well-known, the emitter arrays 11 may be processed so that the TaSi$_2$ emitter rods 10 are exposed so as to protrude a distance, h, from the base surface 12, where h can be a preselected length typically in the range 2–30 micrometers. Strips of field emitters are assembled to form a single long strip, where the assembled length is determined by the length of the given Xerography drum to be used in the process. The pixel contacts 16 are generally made on the backplane 18 of the TaSi$_2$ wafer material 14, and effect contact with the exposed emitter tips 10 on the front face by means of the continuity of the TaSi$_2$ material rods through the composite substrate 14. These pixel contacts 16 may be formed from a number of materials including patterned diffusion layers of Ti—Ni—Au, Ti/W—Pt, or cobalt silicide, or may simply be circuit elements processed into an Si-epilayer that has been grown on the backplane 18 of the eutectic composite wafer 14.

Figure 2:
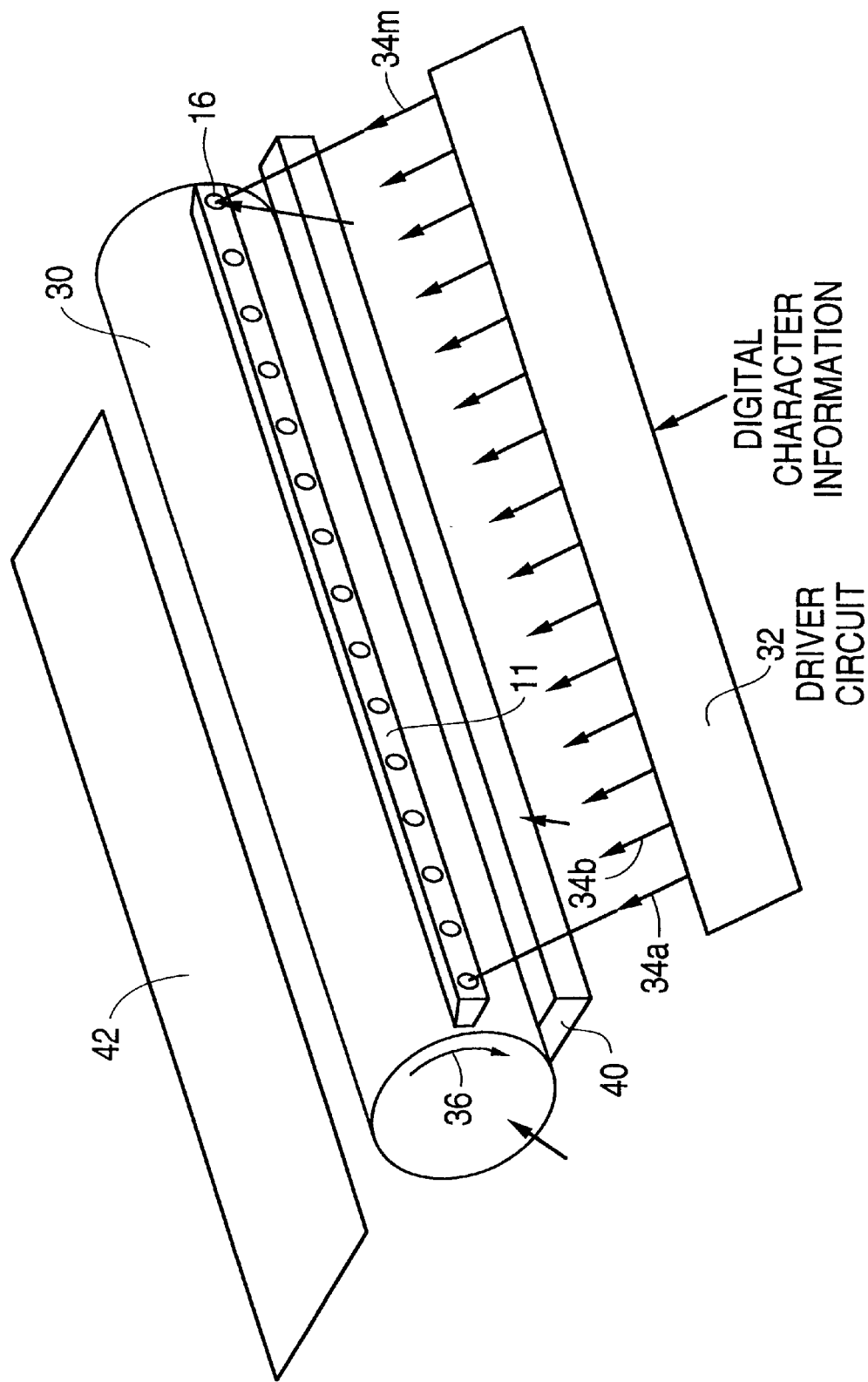
FIG. 2 is a schematic diagram of an embodiment of a pattern transfer device in accordance with the present invention that may be utilized in a printing function.
Figure 3:
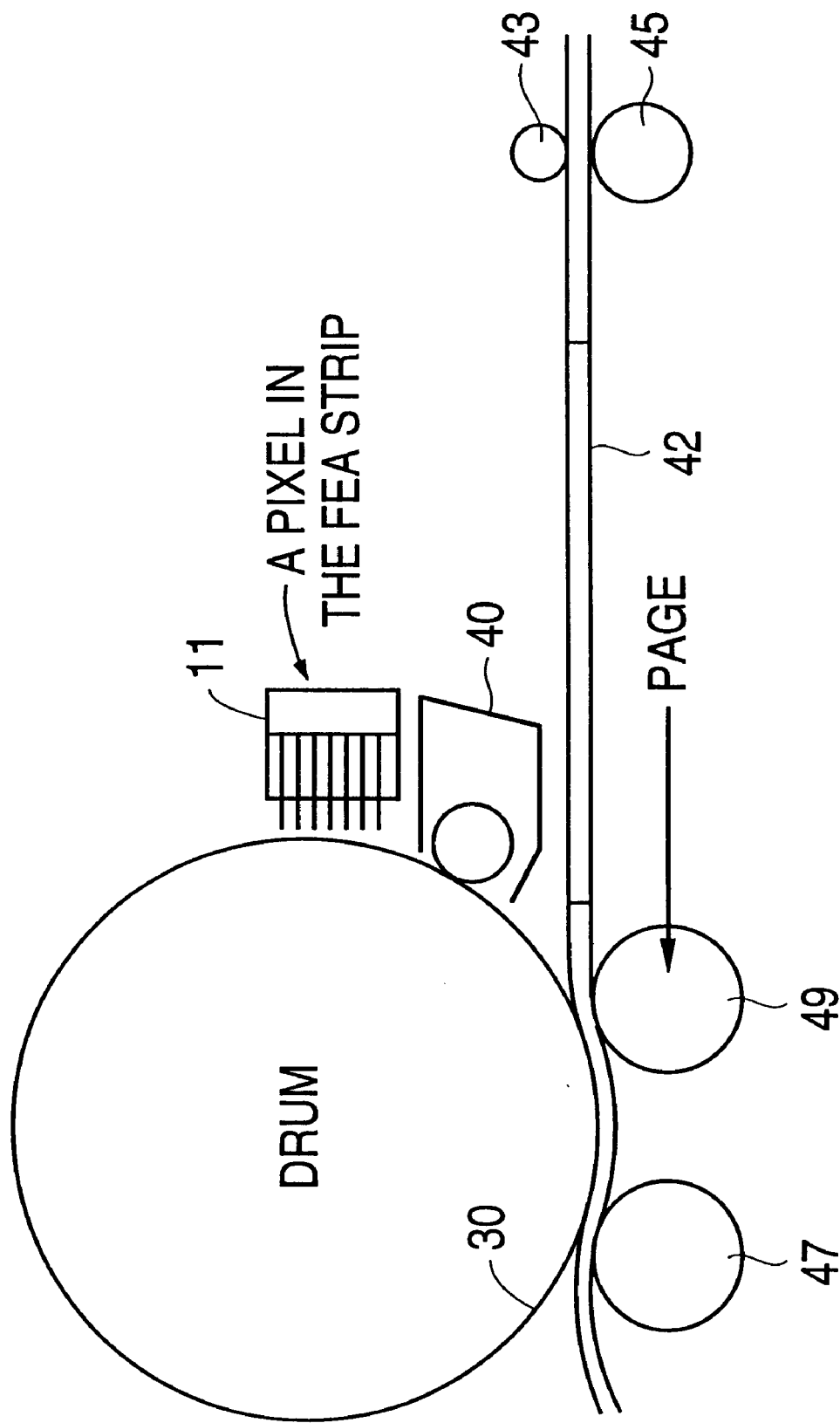
FIG. 3 is a different schematic view of the pattern transfer device shown in FIG. 2 showing additional detail.
Figure 11:
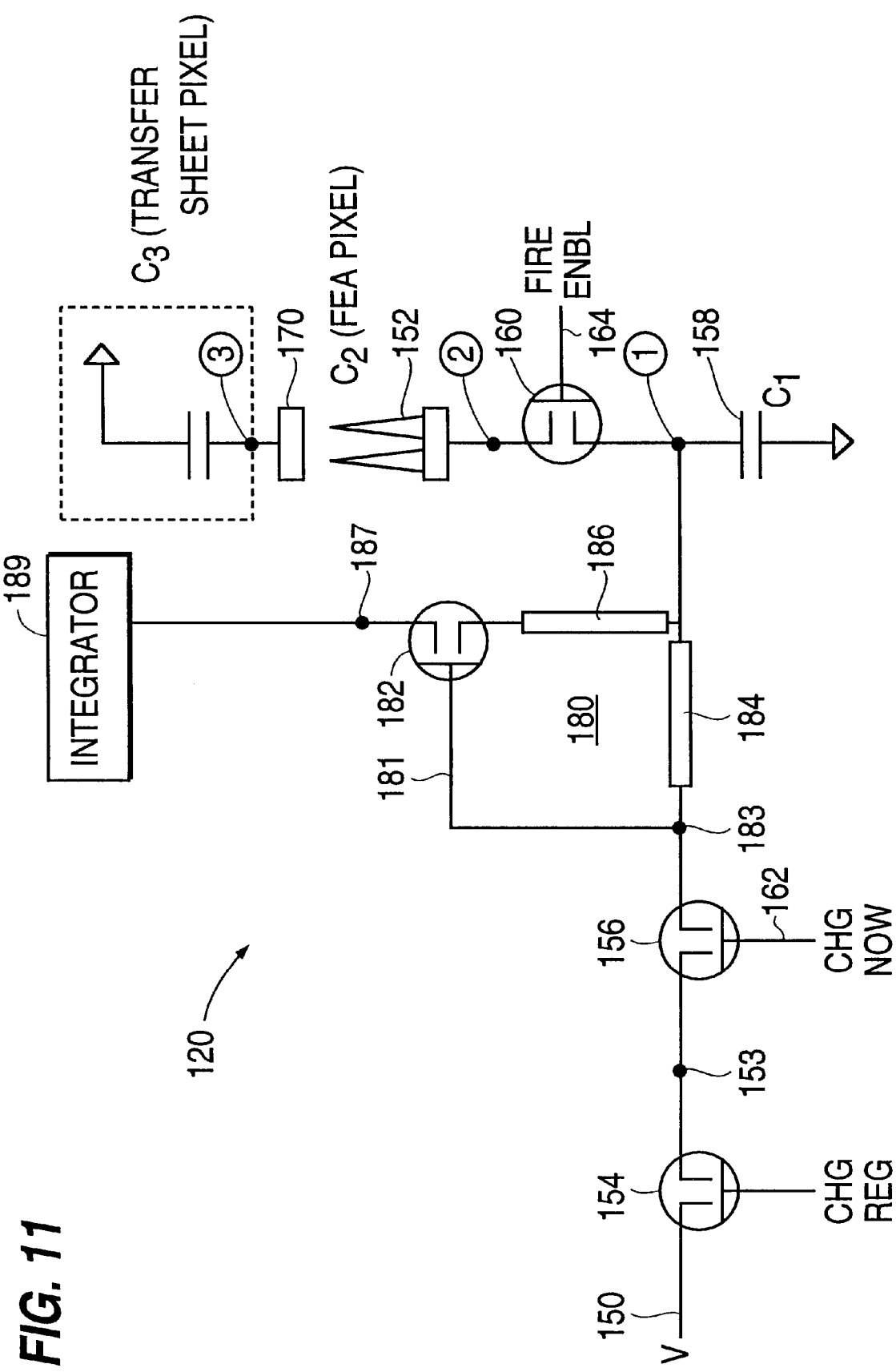
FIG. 11 is a schematic diagram of a pixel driver/sampler circuit that may be utilized to implement the present invention.

Referring now to FIGS. 2 and 3, there is shown a schematic diagram of one embodiment of a pattern transfer device of the present invention. The figure shows an ungated field emitter array 11 for depositing charge in accordance with a control signal, at least one pixel or surface 30 for receiving and storing a charge, and a driver circuit 32 for driving the field emitter array 11 to cause an electrical discharge across the gap between the field emitter array and the pixel or surface 30 by means of control signals. The driver circuit 32 applies a separate control signal on lines 34A–34M to each of the pixel contacts 16. A variety of different circuits may be utilized to implement the driver circuit 32. A preferred embodiment for implementing the driver circuit 32 is shown in FIG. 11, which will be discussed in detail later. The at least one pixel 30 may be comprised simply of a surface that is placed in adjacency to the field emitter array 11. It is preferred that the field emitter array be disposed so that the tops of the emitter rods 10 are facing and in extremely close proximity (between 5 and 10 micrometers) to the surface 30 which is to receive and store charge in a two-dimensional pattern.

It has been discovered that the separation between the rod-like emitter tips 10 should be approximately equal to or greater than the separation between the emitter tips 10 and the surface 30 in order to avoid agglomerate tip breakdown across the tips. A typical separation between emitter tips 20 is approximately 6–10 micrometers, and a typical separation between the ends of the tips 10 and surface 30 is approximately 5 micrometers. Similarly, the separation between pixel contacts should be greater than or approximately equal to the separation between emitter tips. In the particular case of the Si—TaSi$_2$ FEA material, additional care is necessary to prevent pixel crosstalk due to the angular dispersion in the alignment of the tips, which may be 3–7 degrees for Czochralski grown crystals of Si—TaSi$_2$. This further necessitates that the thickness of the Si—TaSi$_2$ material in the areal vicinity of the pixel is not significantly greater than the lateral dimension of a pixel.

In one embodiment of the present invention, the surface 30 may be comprised of a drum or roller. In normal Xerography systems the drum or roller 30 is typically negatively charged. The drum or roller 30 may comprise a CdSe or other type of photostatic drum.

In operation, a small voltage pulse or control signal is applied by the driver circuit to selected backplane pixel contacts 16 in order to drive an electrical discharge from the exposed tips connected to those selected pixel contacts 16. The driver circuit 32 can include circuitry to permit a gray-scale of charge levels to be emitted from a given pixel in accordance with the control signal. During this emission process, the surface or drum 30 is rotated in the clockwise direction shown by the arrow 36 in the figure. Accordingly, the field emission of electrons from the various pixels that are driven by the lines 34A–34M from the driver circuit over a period of time in conjunction with the rotation of the drum 30 will cause a two-dimensional pattern of charge to be deposited on the drum 30.

The system may further include a toner dispenser 40 disposed to apply toner to the drum 30 after it has received its charge deposition from the selected pixels in the FEA strip 11. A material 42 may then be brought into contact by means of rollers 43, 45, 47, and 49 with the two-dimensional pattern of toner on the drum 30 to transfer the two-dimensional pattern onto the material 42. A variety of materials may be utilized to receive this two-dimensional printed pattern, including paper.

It should be noted that the switching speeds of the FEA pixels required for high speed pattern transfer are easily within the demonstrated capabilities of the Si—TaSi$_2$ eutectic composite FEAs. The Si—TaSi$_2$ eutectic composite FEAs 11 have demonstrated on-off speeds well in excess of one hundred MHz. By way of example, to print two 8½ wide pages per second, with 1200 DPI in resolution, the required pixel transfer speed is 20,400 dots-per-second, or approximately a time interval of 50 microseconds per dot. This is a factor of 20,000 more than the demonstrated switching times of the eutectic composite FEAs. While switching times of 2 nanoseconds have been demonstrated, the ultimate switching time of the Si—TaSi$_2$ FEAs is estimated to be less than 10 picoseconds. Accordingly, the ultimate switching speed of a triggered FEA will be determined by the capabilities of the triggering circuit, not by the fundamental limitations of the FEA.

The total charge that must be deposited to drive the Xerography process is likewise easily within the demonstrated capabilities of the eutectic composite field effect emitter arrays. The Si—TaSi$_2$ cathodes have demonstrated average circuit densities of greater than 40 amperes per square centimeter, corresponding to average tip currents of greater than 40 microamperes per field emitter tip in the array. In a time interval of 20 microseconds, this corresponds to an emitted charge per tip of 800 pico-coulombs or approximately $5 \times 10^9$ electrons. In a 20 micrometer diameter pixel, with an average tip density of $1 \times 10^6$ tips per square centimeter, such as is typical for Si—TaSi$_2$ arrays, there will be approximately 2–5 emitters. This places the total available charge per pixel at approximately 2000 pico-coulombs. This is many orders of magnitude in excess of what is required for the Xerography process, and serves to illustrate the amount of dynamic range that is available from this type of system. Typical values for the deposited charge will be perhaps a factor of $10^6$ smaller, allowing the emitters to run at a more modest current density of 40 microamperes/cm$^2$.

It should be noted that the driver circuit is providing electrical pulses on the lines 34 so that there is a voltage drop in the gap between the emitter rods in the selected pixels of the emitter array 11 and the drum 30 on the order of 30–90 volts. This voltage drop from the rod-like emitter tips 10 to the drum 30, combined with the short spacing from the drum to the emitter tips, and the field enhancement factor of the emitter tips is sufficient to drive an electrical discharge. Specifically, the electric field placed across the gap between the rod-like emitter tips 10 and the drum 30 is of a sufficient field strength to drive an electric discharge and substantially equilibrate the voltages on the emitter pixel and the target area on the drum.

The prior art describes an approach for selecting the dimensions and operating voltages of a gated field emitter array structure such that field effect emission of electrons is induced at the tip of each emitter spike, at an applied voltage that lies below the Paschen breakdown threshold of the medium in which the electrode gap is operated. The geometry of the gated FEA structure cited in the prior art is constrained by the necessity for the gate electrode to be in close proximity to the FEA tip, which is required by that configuration to drive field effect emission from the tip structure. The prior art insightfully shows that the gated configuration can avoid Paschen breakdown, or sparking, by operating on the low (pressure×distance) side of the Paschen curve. Unfortunately, the prior art overlooks the effect of corona in the near vicinity of the gate-tip electrode structure. In the case of gated FEA structures operating in air at or near atmospheric pressure and ambient temperature, the effect of corona can impose a potentially severe parasitic loss of current from the desired tip to media path.

The critical electric gradient at the surface of a conductor necessary to produce corona in air is given for coaxial cylinders by the empirical equation $$E_c = 31\left(1 + \frac{0.308}{\sqrt{a}}\right) \text{kV/cm}$$

where a is the radius of the inner cylinder in centimeters, and we have assumed normal atmospheric pressure (760 mm Hg) and 25° C. temperature. The critical voltage for the onset of corona in a concentric cylinder geometry is therefore given by $$V_c = E_c a \ln\left(\frac{R}{a}\right) \text{kV}$$
$$V_c = 31(a + 0.308\sqrt{a})\ln\left(\frac{R}{a}\right) \text{kV}$$

where R is the radius of the outer cylinder in centimeters, and $E_c$ and a have their meanings from the previous equation.

Gated FEA structures, such as those cited in the prior art, operate on the principle of exceeding the electric field gradient necessary for field effect emission of electrons only in the near vicinity of the tip apex. Emission from the tip apex, with the tip apex positioned in, or nearly in, the plane of the gate aperture, yields electron trajectories that are not intercepted by the gate electrode and that can be used externally for desired effect. For typical metals, electric field gradients of ~$10^7$–$10^8$ V/cm are necessary for field effect emission. For an emitter tip in air this threshold is increased by the presence of adsorbed gases on the surface of the emitter tip, which act as a dielectric screen, partially shielding the metal tip from the applied field.

The prior art teaches that for a gated FEA tip structure with a tip radius of curvature of 500 Å centered and in the plane of a 1.5 µm diameter gate aperture, gate voltages>100 V are necessary to drive field effect emission from the FEA tip. Considering the effect of corona in that same structure, for the region near the FEA tip we have in the above equations for corona, $\alpha \cong 5 \times 10^{-6}$ cm, $R \cong 7.5 \times 10^{-5}$ cm, and $V_c$ ~60V. For the region slightly below the tip apex, and directly opposite the lower edge of the gate electrode, $\alpha \cong 10^{-5}$ cm, $R \cong 7.5 \times 10^{-5}$ cm, and $V_c$ ~61V. Accordingly, at voltages significantly less than that necessary to cause field effect emission from the tip apex, corona will appear over a relatively large area of the tip, as compared to the area of the tip active in the field effect emission process. The negative corona from the tip structure will be augmented by a positive corona from any sharp corners on the gate structure. This corona will feed a discharge in the volume between the tip and gate electrode, imposing a potentially severe parasitic loss of current from the intended tip-to-media path.

In sharp contrast to prior art, the present invention teaches the use of an ungated field emitter array and an integrated electrode/transfer media system. Specifically, one electrode in the system is the field emitter array of tips, while the second electrode is integral to the pattern transfer media. This design obviates the need for a local control electrode in close proximity to the field emitter array, correspondingly eliminates the constraint in U.S. Pat. No. 5,166,709 of operating below the Paschen curve, and simultaneously obviates any concerns of parasitic losses due to corona between the emitters and a gate electrode.

Correspondingly, the present invention can operate below, at, or above the Paschen curve according to the greatest advantage presented by other system considerations. Further, whereas in the prior art the action of corona on the field emission electrodes presented a path for parasitic loss, in the present invention the action of corona on the field emitter tips is useful and is a beneficial mechanism for "seeding" the discharge between the emitter pixel and the target area on the drum.

It should be noted that preferred scale size is approximately a 5–20 micron spacing from the FEA array tips to a transfer surface. It should further be noted that in air, at pressures near 760 Torr (e.g., atmosphere), the field enhancement factor attendant to the 5–20 micron spacing and the highly featured emitter surface will effect a volumetric discharge over the area of the pixel rather than a point to point spark. Specifically, the emitters of the FEA are initially unbiased and "off." When the control signal to turn the FEA emitters "on" is applied, the negative voltage on the FEA emitters will rapidly rise from zero toward its full "on" value. At an intermediate value, the voltage on the FEA emitters will exceed the value necessary to either drive field emission from or form corona on the tips. This initial ionization effectively "seeds" the volume between the FEA tips and the transfer surface. As the full "on" voltage is achieved on the tips, this seeding allows a volumetric discharge to occur. This latter volumetric discharge is also sometimes referred to as a Townsend discharge or "dark" discharge. This design intentionally minimizes the possibility of a point to point spark discharge that would damage the emitter tips and the transfer surface, and that would result in limited equipment lifetime.

It will be obvious to those practiced in the arts of field emitter arrays or gas discharge devices that the precise spacing of the field emitter array with respect to the target pixel surface may be optimized for a particular performance parameter. It will further be obvious that changes to the ambient atmosphere within which the device operates, either with regard to pressure, temperature, or chemical composition, will alter the optimal device dimensions and voltages. The functional variations of corona, field emission, and electrical discharges with respect to these environmental variables are well understood and readily available to one practiced in their arts.

Figure 4:
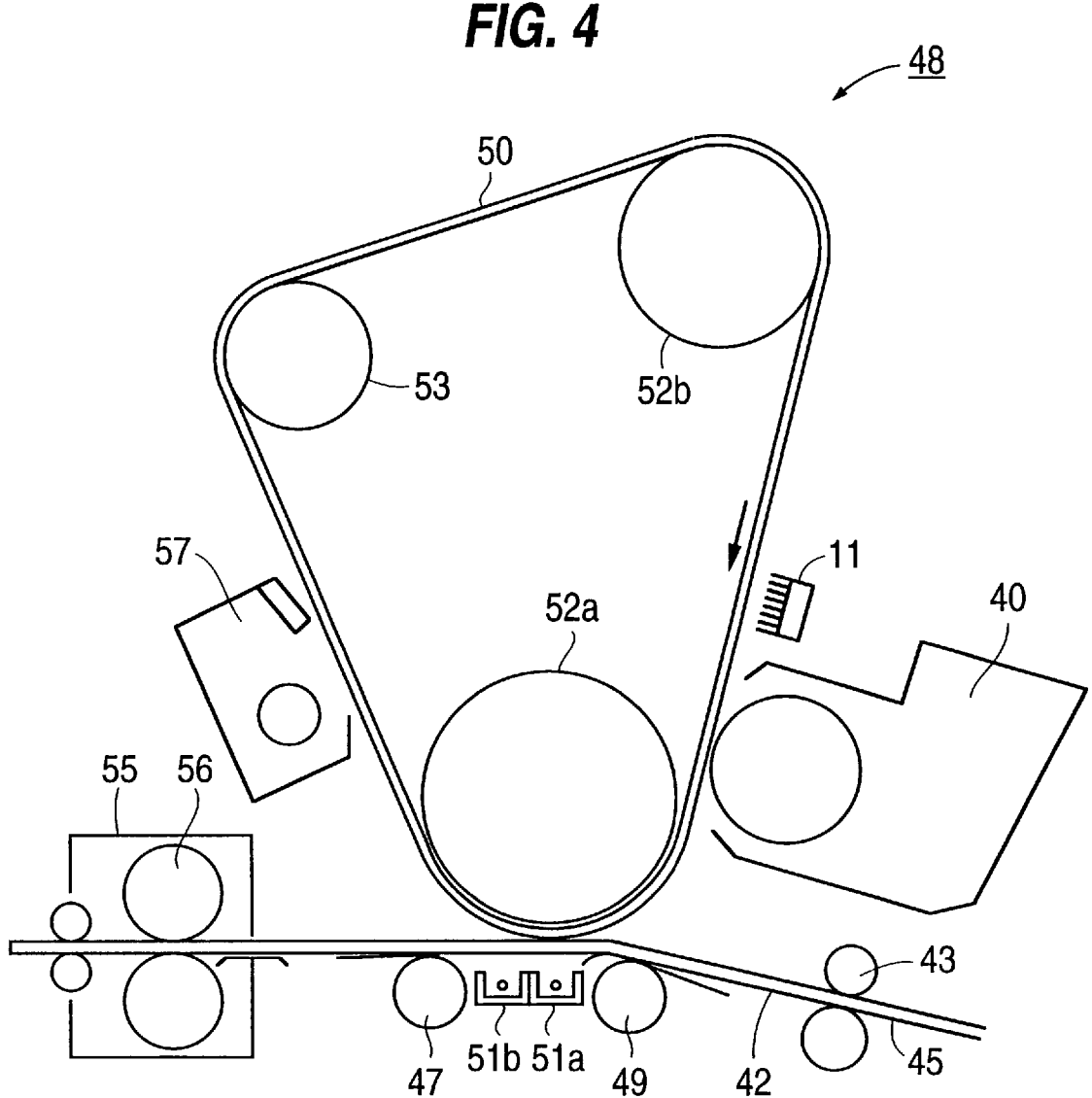
FIG. 4 is a schematic diagram of an embodiment of a pattern transfer device in accordance with the present invention that may be utilized in a printing function.

Referring now to FIG. 4, there is shown a further embodiment of the present invention. In this embodiment, the surface 50 for receiving and storing charge in a two-dimensional pattern comprises a sheet which is pixelized with partially conductive pixels. As shown in FIG. 5, each pixel may comprise a conductive dot 54 surrounded by an insulating material. The conductive dots 54 for the pixels may be disposed on the sheet 50 in a variety of configurations including the rectangular configuration shown in FIG. 6a, or the hexagonal configuration shown in FIG. 6b. In a preferred embodiment, these conductive dots 54 may be comprised of a metal such as nickel or copper. The configuration of FIG. 4 further includes a pixelized field emitter array strip 11, a toner dispenser 40, and means such as rollers 43, 45, 47 and 49 for moving a material such as paper 42 in contact with the pixelized sheet 50 in order to transfer the two-dimensional pattern of toner on the pixelized sheet 50 to the page 42. The pixelized sheet may be disposed in a variety of configurations. In the configuration shown in FIG. 4, the pixelized sheet is disposed around rollers 52a, 52b and 53. The roller 53 may also function to provide a selectable voltage bias on the conductive dots 54 of the transfer sheet. Alternatively, brush contacts or some other means may be employed on the front surface of the transfer sheet to the same effect. It should be noted that the pixelized sheet 50 could take the configuration of a roller sheet as shown in the FIG. 4, or a pixelized drum. It is preferred that the pixelized sheet 50 be pixelized at the same dot resolution as the field emitter array pixel strip 11, or with an even higher pixel density than the FEA strip 11.

FIG. 4 also includes standard equipment such as a transfer charger 51a for generating a positive charge toward the rear surface of the paper 42 to attract the negatively charged toner image on the transfer sheet 50 onto the paper 42. The paper 42 is then separated from the sheet 50 by a separation charger 51b. A standard fixing unit 55 is provided to heat and press toners onto the paper 42. The fixing unit 55 includes heating rollers 56 for accomplishing the heating and pressing operation on the paper. Finally, a cleaning blade unit 57 is disposed in proximate contact with the pixelized sheet 50 after the image transfer point to scrape off the toners remaining on the pixelized transfer sheet 50 after the image has been transferred to the paper 42.

In operation of FIG. 4, as a given conductive dot 54 on the pixelized sheet 50 moves past the energized rod-like tip emitters in an energized pixel on the FEA strip 11, charge is deposited onto the metal dot, provided that the bias pulse on the FEA strip pixel 20 is sufficiently high to cause an electrical discharge across the gap between the pixelized sheet 50 and the FEA strip 11.

The pixel dots 54 on the pixelized sheet 50 or drum can be patterned in any format, as noted previously. For example, the pixel dots 54 could be in a square format, a rectangular format, a hexagonal grid, or any other acceptable printing format. Note that if the transfer pixel format on the pixelized sheet is other than rectangular, this format must be taken into account in the design/formatting of the FEA pixelized strip 11 and in the circuitry used in the driver circuit 32 to drive the lines 34.

Figure 5A:
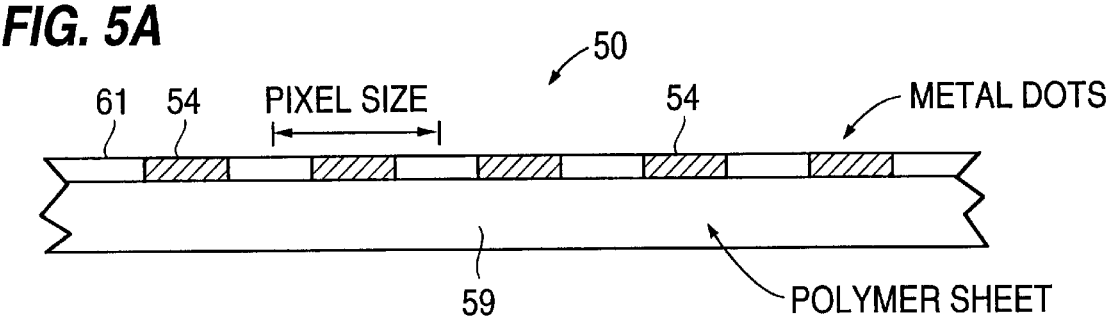
FIG. 5a is a breakaway side view of one embodiment of the pixelized transfer sheet utilized in the present invention.
Figure 6A:
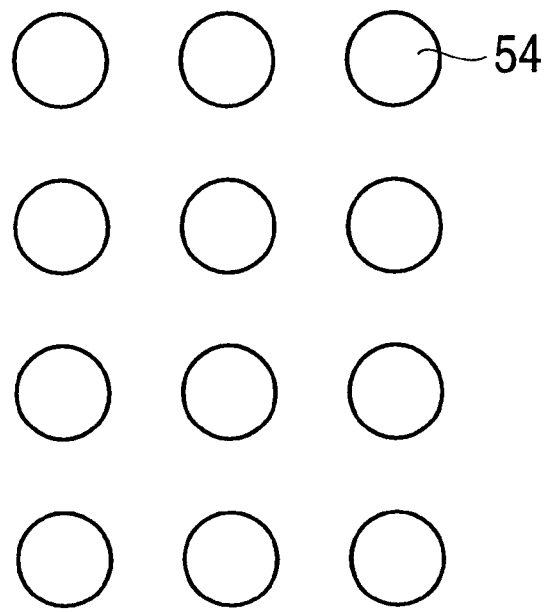
FIG. 6a is a top view of one configuration of pixels on a pixelized transfer sheet that may be utilized in the present invention.
Figure 6B:
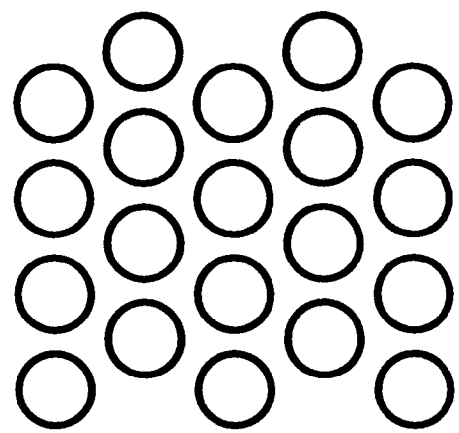
FIG. 6b is a top view of a second configuration of pixels on a pixelized transfer sheet that may be utilized in the present invention.

Referring now to FIG. 5A, there is shown a pixelized transfer sheet 50 that has been fabricated by depositing a patterned metallization on a polymer sheet 59. There are a variety of polymeric materials that may be utilized in order to implement the pixelized sheet 50. In a preferred embodiment, the polymeric material used is Kapton made by the E.I. duPont de Nemours Company. Patterned dots 54 for the pixels may have sizes on the order of one micrometer using standard manufacturing practices. In the configuration shown in FIG. 5A, the metal pixels 54 are relatively thick (on the order of 0.1–1 micrometers) and their tops are approximately level with the top surface 61 of the polymer sheet 59.

The metal dot 54 is the driving element for each pixel in the pixelized sheet 50. However, the pixel diameter is measured from the center of the insulating area on one side of the metal dot to the center of the insulating area on the other side of the metal dot. Depending on the charge density on the conductive dot, the pixel will pick up toner across an area that is greater than the area of its conductive dot 54, but less than the full pixel area. The relative size of the conductive dot 54 within the area of the pixel is tunable to take into account voltage limitations, cross-talk concerns, and toner coverage. It has been found that if the conductive dot 54 is too small relative to the overall pixel size, then in order to attract enough toner to cover the entire pixel, a greater voltage must be applied to the dot. However, the pixel driving voltage may be limited by overall power considerations. In contrast, if the dot is too large relative to the overall pixel size, then there will be cross-talk interference between neighboring conductive dots 54. Conductive dot sizes typically range from 10–60% of the total area of the pixel. A preferred conductive dot size is 50% of the area of the pixel 54.

Figure 5B:
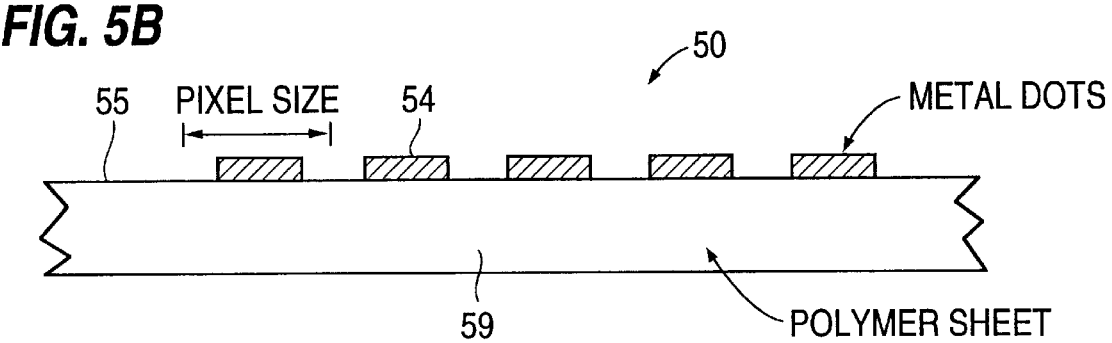
FIG. 5b is a breakaway side view of a second embodiment of a pixelized transfer sheet which may be utilized in the present invention, with the pixels deposited on the top surface of the sheet.

Referring now to FIG. 5B, there is shown a pixelized transfer sheet 50 with the conductive pixels 54 deposited on the top surface 55 of the polymer sheet 53. Typical conductive or metal thicknesses are on the order of 0.1–1 micrometers. It is of course understood, that the metal thickness would be optimized for cost, performance, and lifetime factors.

Figure 5C:
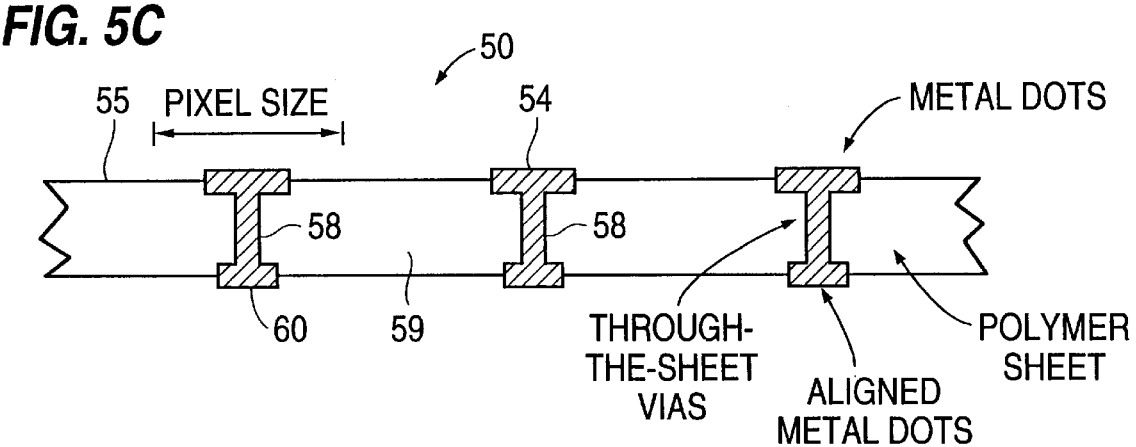
FIG. 5c is a breakaway side view of yet a further embodiment of a pixelized transfer sheet which may be utilized in the present invention. This configuration shows the pixels connected by means of vias to conductive dots on the opposite surface of the transfer sheet.

Referring now to FIG. 5C, there is shown a third configuration of the pixelized sheet 50. In this configuration, a manufacturing process such as laser ablation may be used to drill vias in the polymer sheet 59. The vias might also be made either mechanically or thermally with needle-like imprints. Conductive material or metal may then be deposited as the conductive dots 54 on one side of the polymer sheet, as was done for the configurations of FIG. 5A and FIG. 5B. Additional conductive material or metal may then be deposited through the vias from the opposite side of the sheet 59 to form the conductive vias 58. The size of the conductive material or metal dot 60 which is exposed on the side opposite to the conductive dot 54 are preferably smaller than the dot size of the dot 54. Via diameters are typically less than 5–10 micrometers, using standard processing. Note that FIG. 5C shows a cross-section of a transfer sheet 50 that has a hexagonal pattern of metal dots 54. Accordingly, the spacing for the metal dots 54 is different from FIGS. 5A and 5B.

The advantage to the configuration of FIG. 5C is that it is now possible to apply a bias voltage charge to the conductive dots 54 on the surface 55 without actually touching the dots 54. This biasing could be accomplished by using a biasing roller 53 to charge the dots 54 from the back surface through the vias 58. A significant benefit in wear reduction for the conductive dots 54 is achieved with this configuration.

Figure 10:
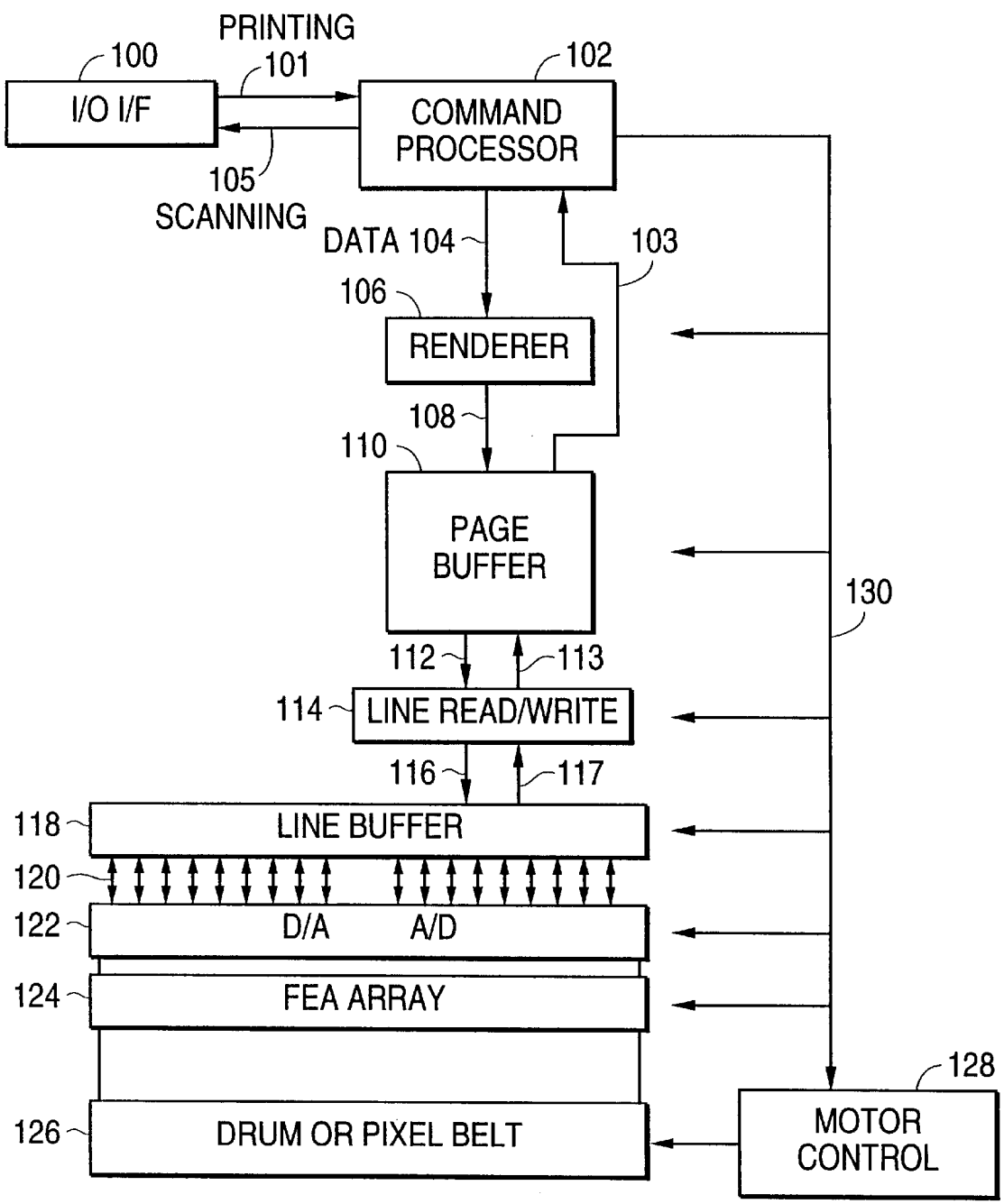
FIG. 10 is a schematic block diagram of an overall printing system utilizing the present invention.

Referring now to FIG. 10, there is shown a block diagram of an overall printing system that may utilize the present invention. The system includes an input/output circuit 100, which may be a standard I/O circuit in accordance with IEEE Standard 1394. Alternatively, this input/output circuit could comprise a fiber channel or an SCSI circuit or an EPP/ECP circuit. The command processor 102 is simply a standard user-controlled command processor for setting the printing parameters for the document to be printed in accordance with a printing language such as POSTSCRIPT from Adobe Corporation, or PCL language from Hewlett-Packard Corporation. Typical commands that would be input by the user would be the number of dots per square inch. A typical command processor type that may be utilized with the present invention is that used in the Lexmark Optra Series laser printer family. The data from line 101 is applied in combination with these printer commands via line 104 to a renderer 106 which takes the data and forms a bit map of a document in accordance with the printer commands. This bit map is a map of ones and zeros for each page, as is well known in the printing art. The bit map of the data is then applied via line 108 to a page buffer memory 110. The page buffer memory 110 is a standard RAM memory which holds the data prior to the printing operation. A line read/write block 114 then takes one line at a time from the page buffer 110 via lines 112. The read/write block 114 applies the one line to a line buffer circuit 118 via the lines 116. The one line held in the line buffer 118 is then applied via lines 120 through a digital/analog converter 122 to the FEA array and attendant driver circuits 124. The FEA array 124 operates to print the one line on the drum or pixel belt 126. Note that a motor control block 128 is also shown for purposes of completeness. The motor control block 128 is a standard device for controlling the motor for the pixel belt or drum 126 in synchronization with data moving in and out of the line buffer 118. In essence, the motor control block 128 provides mechanical control of the movement of paper and the turning of the drum or pixel belt, as in all other laser printers. A schematic line 130 is shown for purposes of illustration, leading from the command processor 102 to all of the elements in the figure, including the motor control block 128, in order to provide a standard clock timing signal thereto.

The configuration of FIG. 10 may also be used for a scanning function. In a scanning function, information is sampled from the drum or pixel belt 126 by the FEA array 124. The line information from the FEA array 124 is then applied through an analog-to-digital converter 122 to the line buffer 118 via the lines 120. The one line output from the line buffer 118 is then applied via the lines 117 to the line read/write circuit 114. The line read/write circuit 114 applies the one line via lines 113 to the page buffer 110. The accumulated scanned page information in the page buffer 110 may then be applied either directly to the I/O circuit 100, or via the command processor 102 by means of the lines 103 and 105. The command processor 102 could function in this mode to provide compression formatting, if desired. If the command processor 102 is to be utilized in the scanning mode, then the command processor should include a command set that includes a printer mode command and a scanner mode command.

It should be noted that the highly parallel approach used in FIG. 10 permits the system to check and continuously calibrate each FEA pixel. This parallel approach is advantageous since data flow at the print head is inherently parallel, not serial as in laser-based printers. The required size for the page buffer in the system will simply depend on the pixel density and dot resolution of the output page. It should also be noted that the pixels are precisely registered, and therefore their relative position is static. The minimum pixel size and maximum resolution are fixed by the minimum pixel size of the FEA array, and possibly by the pixelized transfer sheet. Groups of pixels may be gathered together as larger pixels, if the incoming data is not presented in a maximum resolution.

Figure 7:
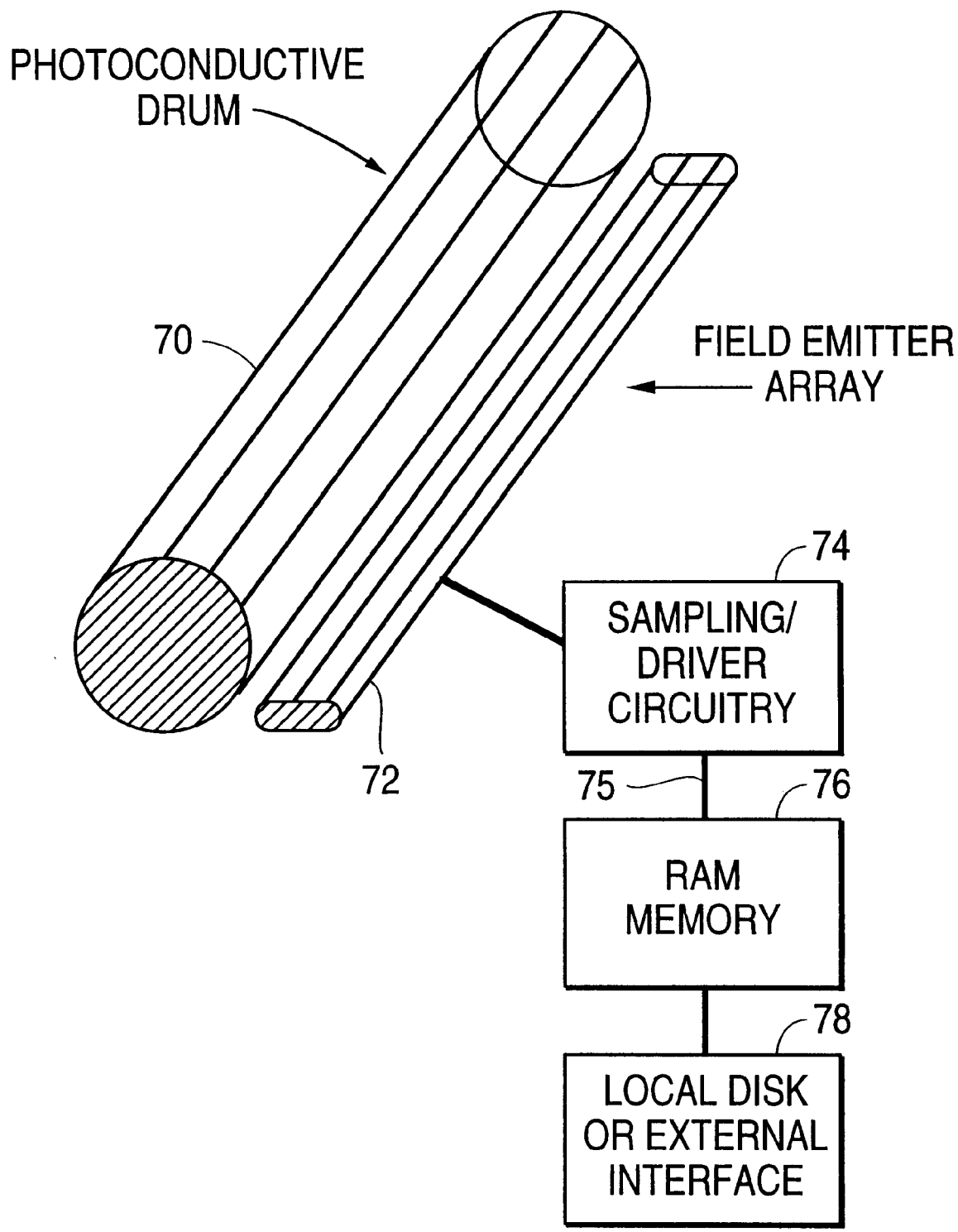
FIG. 7 is a schematic diagram of a device for sensing charge distribution on a surface that may be utilized to implement the present invention.

Referring now to FIG. 7, there is shown a yet further embodiment of the present invention. In this figure is shown a device for sensing charge distribution on a surface. The device comprises a photostatic surface 70 for storing a two-dimensional charge pattern, a linear array of field emitters 72, and means for creating relative closely-proximate movement between the linear array of field emitters 72 and the two-dimensional pattern. The device further includes a sampling circuit 74 for sampling the linear array 72 of field emitters during the relative movement between the linear array of field emitters 72 and the two-dimensional pattern so that the two-dimensional pattern is effectively sampled and a sampling signal is generated that is representative thereof and applied on line 75. FIG. 7 further includes a storage device 76 for storing the sampling signal that is representative of the two-dimensional charge pattern. Finally, the device may include standard local disk or external interface equipment 78 for operating on the stored sampling signal.

The photostatic surface 70 may conveniently take the configuration of a photosensitive drum. Such photosensitive drums are well known in the art and are typically uniformly charged by negative charges to, for example, approximately −700 volts by means of corona charging. In standard operation, light reflected from a pattern to be scanned is applied to the surface of the photosensitive drum 70. The electrical resistance is lowered for only that portion of the photosensitive drum 70 which is illuminated. The negative charges on that portion of the photosensitive drum which has been illuminated by the reflected light are eliminated by the charge flow caused by this lowered resistance. This operation thus creates an electrostatic latent image. The recording light used to create the reflected light may generally be a laser light or a light modulated according to an image scanned by a rotating mirror.

In the configuration of FIG. 7, the field emitter array 72 is biased positively with respect to the photoconductive drum. Accordingly, when a negative region on the photosensitive drum 70 passes by the more positive region on the pixelized field emitter array, and if a sufficient voltage difference is present, an electrical discharge is obtained between the two regions. This electrical discharge flow will cause the charge state of the FEA pixel to fall. This change in the charge state of the FEA pixel may be detected by means of a variety of methods including detecting current flow or a reduced voltage on the FEA pixel.

Various configurations may be utilized in order to obtain the correct biasing between the FEA strip and the two-dimensional charge image in order to ensure the proper emission of the field emitter tips during scanning. The biasing may be adjusted directly on the photosensitive drum itself or on the biasing circuits for the FEA strip. It should be noted that the nominal ~700 V bias on standard photoconductive drums is set by the requirements for printing or copying. For the scanning operation described herein, the photoconductive drum can readily operate with significantly lower bias voltages. It should be understood that the combination of photoconductive drum and FEA bias voltages may be optimized to achieve desired contrast, resolution, cost, and lifetime performance factors.

Figure 8:
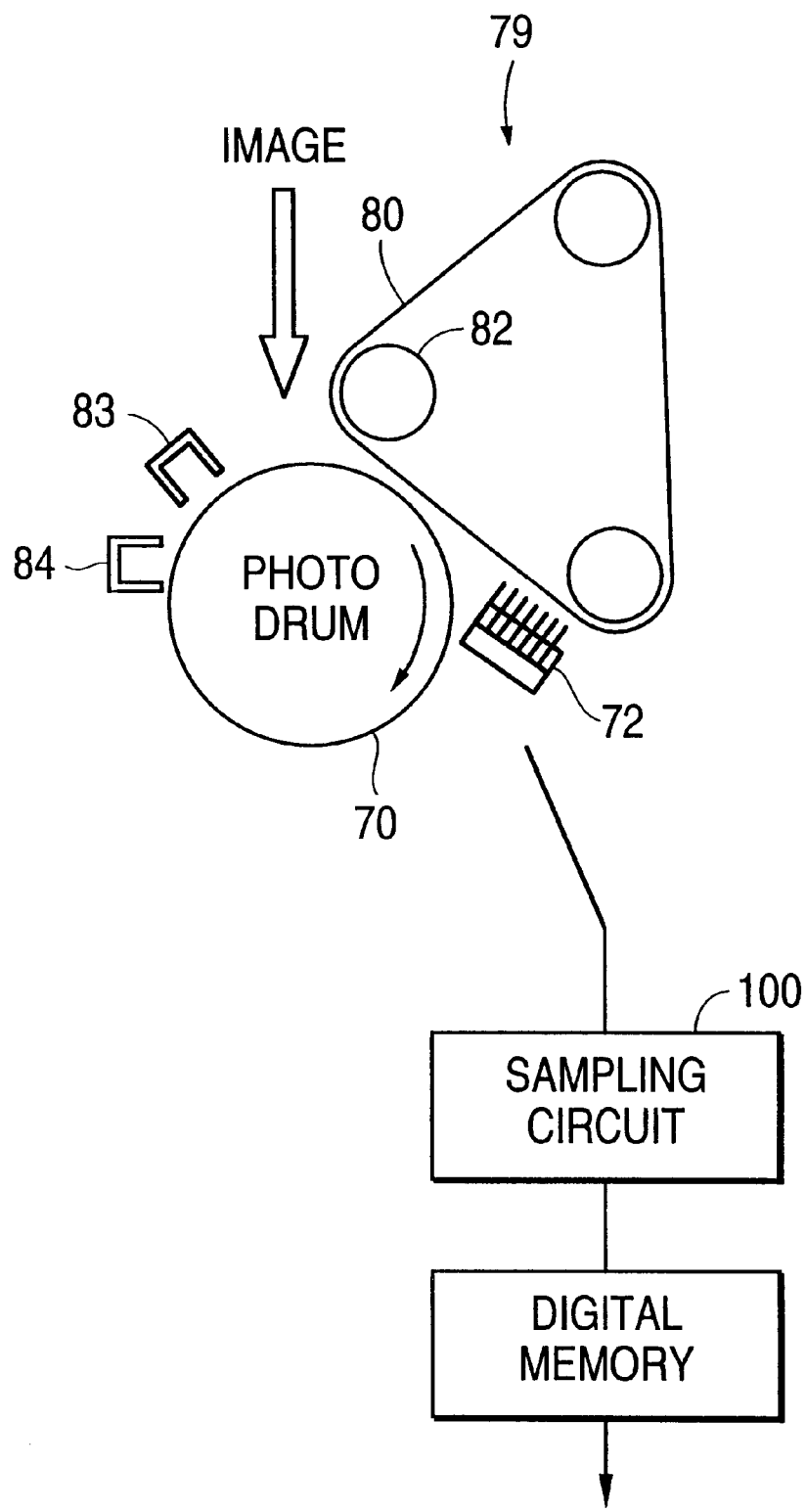
FIG. 8 is a schematic side view of a further embodiment of a device for sensing charge distribution on a surface that may be utilized to implement the present invention.

Alternatively, and in a preferred embodiment, a pixelized transfer sheet may be utilized in a configuration described below in order to adjust to attain the appropriate biasing voltage drop between the two-dimensional charge image and the FEA readout strip. FIG. 8 shows a yet further embodiment of a device for sensing charge distribution in accordance with the present invention. This embodiment again comprises a photoconductive drum 70 and a pixelized FEA 72. The photoconductive drum 70 includes standard attendant equipment such as a charging unit 83, for example, a corona charging unit, for applying a negative bias charge on the drum. Other attendant equipment would include an erasing lamp 84 for exposing the drum to light to remove any remaining charges on the drum after image transfer and before biasing by the charging unit 83.

In this embodiment, the means for creating relative closely-proximate movement between the linear array of field emitters 72 and the two-dimensional pattern comprises a pixelized transfer sheet 80. The pixelized transfer sheet 80 may have pixels disposed in the format shown in FIG. 6, or in any other convenient format. The pixelized transfer sheet 80 is charged or biased positively with respect to the photoconductive drum 70 by a bias electro-contact roller 82.

In a preferred embodiment, the pixelized transfer sheet 80 may be disposed so that it rolls in contact with the photoconductive drum 70. As this contact between the photoconductive drum 70 and the pixelized transfer sheet 80 occurs, areas that are more negatively charged on the photoconductive drum 70 will merge with and influence toward a negative bias the less negatively charged corresponding pixels in contact therewith on the pixelized transfer sheet 80. The voltages present on the pixels on the pixelized transfer sheet, after contact with the photoconductive drum, will depend on the voltage state of the photoconductive drum in the region contacted by the pixel, the capacitance per unit area of the photoconductive drum, the capacitance of the individual pixels, and the initial voltage state of the pixels on the pixelized transfer sheet immediately prior to contact.

As noted above, in the present embodiment with the photoconductive drum 70 holding negative charge, the transfer sheet must be biased to a voltage level that is less negative. For example, if the photoconductive drum 70 is biased at a voltage of −300 volts, then the transfer sheet 80 is preferably biased more positively than the drum 70 by at least a few hundred volts. In a preferred embodiment, the transfer sheet 80 would be biased by the roller 82 to ground and the capacitance of a pixel on the transfer sheet would be approximately three times the capacitance of the corresponding area on the photoconductive drum.

It may be advantageous to provide a potentiometer or an automatic adjustment circuit to dynamically adjust the bias voltage applied to the transfer sheet 80, as a contrast/brightness adjustment for different materials and patterns being scanned. This adjustment will permit tuning for maximum sensitivity and scanning range. If an automatic adjustment circuit is used, it could be calibrated on a test object or other convenient reference. The pixelized transfer sheet 80 may further be disposed in proximate contact with the FEA pixel strip 72.

In operation, if there is no negative charge on a given area of the drum 70 (the reflected light from the light areas of a scanned pattern has lowered the resistance of the drum 70 in that area so that the negative charge thereon has been drawn off) then the more positive bias charge on the transfer sheet 80 that contacted that area of the drum 70 will remain (not be canceled) and the potential difference between that area of the transfer sheet 80 and the appropriate pixels on the FEA array 72 will be sufficient to drive an electrical discharge and will draw an emission of electrons from those FEA pixels. In contrast, if the negative charge on the drum 70 has not been drawn off by means of reflected light, then this negative drum charge will cancel or lower the more positively charged transfer sheet 80 in those areas of contact to below the voltage necessary to drive an electrical discharge. Accordingly, electrons will not be emitted from the adjacent FEA pixels during the scanning of this area of the transfer sheet by the FEA array. The pixelized FEA strip 72 may be dynamically biased to emit more or less current in response to the level of charge on the pixelized transfer sheet. This pixel current or after-voltage flowing from or to the individual FEA pixels may be detected to determine which pixels were on or off, or which pixels drew more or less current.

Referring now to FIG. 11, there is shown a driving and sampling circuit 120 for detecting which of the pixels in the FEA array 72 were emitting.

The circuit shown in FIG. 11 may also conveniently be used to drive the FEA pixels in a printing mode. The circuit of FIG. 11 will first be discussed in its printing mode wherein it is functioning to drive an FEA pixel into electrical discharge. In the printing mode, a voltage source comprising line 150 provides a charge for driving an individual FEA pixel 152 into electrical discharge. The charge on line 150 is provided through a charge regulator switch 154 and a charge-now switch 156 to a storage capacitor 158 having a capacitance, $C_1$. The charge on the storage capacitor 158 is then provided to the FEA 152 through a fire-enable switch 160, when that switch is appropriately enabled.

Referring now with more specificity to the elements of FIG. 11, the charge regulator switch 154 is an optional control switch for throttling the amount of voltage or charge that is applied to the charging input of the driving circuit. This charge regulator switch 154 may be used to compensate for pixel-to-pixel fabrication variations in the capacitance, $C_1$, of the storage capacitors 158 for the plurality of different pixels 152 in the FEA array. By way of example, each charge regulator switch 154 could be controlled by an EPROM or memory latch which would be programmed to the relative voltage level that each pixel must be brought in order to compensate for fabrication variations in the capacitance, $C_1$, of the storage capacitors 158.

The charge-now switch 156 may simply comprise a standard FET that connects the voltage or charge source 150 to the storage capacitance 158 upon the appropriate application of a Boolean on/off control signal on line 162. The storage capacitance 158 may comprise, in one embodiment, a standard capacitor that provides charge for the FEA 152.

The fire-enable switch 160 may be a standard FET controlled by a Boolean on/off signal via the line 164. When the fire-enable switch 164 is closed, charge will be provided from the storage capacitor 158 to the FEA pixel 152. If the resulting voltage difference between the FEA pixel 152 and a receiving pixel electrode 170 is sufficiently large, an electrical discharge will result and charge transfer will occur between the FEA pixel 152 and the receiving pixel electrode 170. It should be noted that the intrinsic capacitance between the FEA pixel 152 and the receiving electrode 170 on the pixel transfer sheet is designated as the capacitance, $C_2$. Likewise, the capacitance between the receiving pixel electrode 170 on the pixel transfer sheet and ground is designated as $C_3$. If there is no ground contact nearby, then $C_3$ represents the capacitance between the receiving electrode 170 and free space.

The circuit of FIG. 11 further includes a sample-out circuit 180, comprising in the configuration shown in FIG. 11, a sample-out switch 182 and two resistance elements 184 and 186. Resistance element 184 is an in-line resistance element connected between the charge-now switch 156 and one plate of the storage capacitance 158. The resistance element 184 is designed to limit the peak current flow from the charge or voltage source 150 to the storage capacitance 158. The resistance element 186 is an in-line resistance element designed to limit the current flow through the sample-out switch 182. In the embodiment shown in FIG. 11, the sample-out switch 182 may comprise a self-firing detector that detects the output of a signal when current flows through the charge-now switch 156 to the storage capacitance 158. In the configuration shown in FIG. 11, the sample-out switch 182 may simply comprise an FET with its gate terminal connected by line 181 to a junction 183 between one terminal of the charge-now switch 162 and one terminal of the resistance element 184. A second terminal of the sample out FET 182 is connected to one terminal of the resistance element 186. The other terminal of the resistance element 186 is connected to the junction 1, which is the second terminal 187 for the resistance element 184. The third terminal for the sample-out FET 182 may be used as the sample output terminal.

Note that the capacitance, $C_2$, between the FEA pixel 152 and the transfer sheet pixel electrode 170 is approximately $\epsilon_0 A/d$, where A=entire pixel area and d=spacing from the tops of the FEA tips to the receiving electrode 170. Taking $A=300 \times 10^{-12}$ m$^2$, $d=8 \times 10^{-6}$ m, $\epsilon_0 = 9 \times 10^{-12}$ F/m, then $C_2$ ~0.0003 pF. If a 5 pC charge is necessary for a 300 dpi pixel, then a 5/16 pC charge is necessary for a 1200 dpi pixel, such as $C_2$. This corresponds to a voltage of $V_2$=1000V.

However, the minimum electrical discharge voltage for this FEA pixel 152-transfer sheet electrode 170 pixel will not exceed the threshold for formation of corona or for the field effect emission of electrons, whichever occurs first. For the case of the formation of corona on the field emitter tips, the relevant approximate scaling relations were given earlier. For ungated field emitter tips with a tip radius of curvature ~100 Å, height ~10 microns, and a tip-apex-to-pixel-electrode separation of ~5 microns, $V_c \leq 60$ V. Using measured field emission performance parameters for Si—TaSi$_2$ ungated field ) emitter arrays of this same microstructure, an applied voltage of 60 V will generate approximately $10^{-5}$ Amperes per tip field emission current, while an applied voltage of 36 V will generate approximately $10^{-9}$ Amperes per tip of field emission current. Depending on the precise configuration and microgeometry of the FEA and target electrode system, either or both of these mechanisms will seed the interelectrode volume with electrical charge, leading to the desired low voltage Townsend discharge. All three of these mechanisms (corona, field emission, and Townsend discharge) may effectively contribute to the transport of current between the FEA and the target electrode.

The minimum voltage for a Townsend discharge is determined by the ionization potential of the interelectrode medium. For air the normal ionization potential is approximately 13V. Established art has found that a more practical value as it relates to gas discharges is ~25 V. A preferred minimum design value is therefore 25–35 V potential difference between the FEA and target electrodes for the establishment of a Townsend discharge. As the charge builds up on the receiving pixel electrode 170, the voltage of the FEA pixel 152 will have to increase to compensate and maintain this 25–35 V voltage difference between the FEA pixel 152 and the opposite electrode 170 on the pixel transfer sheet.

However, if the capacitance $C_3$ between ground and the pixel electrode 170 on the transfer sheet is relatively large, then $C_3$ will maintain the voltage on the receiving pixel electrode relatively low as the charge is stored, so that the entire circuit can run at moderate voltages<30–60 V . To store 1 pC of charge at 30V requires a capacitance $C_3$=0.033 pF. Note that using approximately the same pixel area for $C_3$ as for $C_2$ for convenience of design, but using an interstitial dielectric with a dielectric constant of ~10, requires a spacing, d, for $C_3$ of approximately 0.8 μm. This spacing may be achieved, for example, with an ion beam assisted deposition coating of alumina on the backplane of the transfer sheet pixel array, followed by the deposition of a metal ground plane. The 0.8 μm coating will easily provide the capacitance to achieve the 20–30 V charge that is desired. The advantage to this design is that the entire circuit can operate below 30–60 V, providing an advantage in cost and size of fabrication for all of the associated electronics.

Figure 5D:
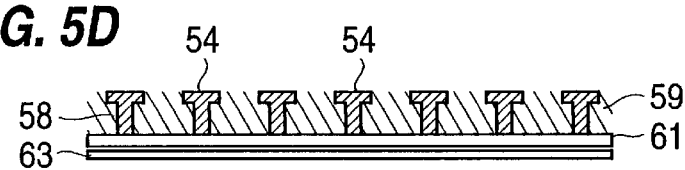
FIG. 5d is a breakaway side view of yet a further embodiment of a pixelized transfer sheet which may be utilized to implement the present invention.

An example construction of such a transfer sheet pixel configuration is shown in FIG. 5D. This configuration of the pixelized transfer sheet 50 is similar to the configuration shown in FIG. 5C. Vias may be drilled in a polymer sheet 59. Conductive material or metal may be deposited as conductive dots 54 on one side of the polymer sheet. Conductive material may then be deposited from the opposite side of the polymer sheet 59 through the via holes to form the conducting vias 58. A thin insulating layer 61 may be deposited over this opposite side of the polymer sheet 59. Typical insulator layer thicknesses may be on the order of 600 Angstroms, and may be, for example, of alumina, as noted above. Finally a conductive or metal backing layer 63 may be deposited over the insulating layer 61.

It should be noted that the use of a continuous layer 63 as the conductive or metal backing for the pixelized transfer sheet is advantageous in that it: avoids small energy surges in the sheet and is relatively easy to fabricate. However, it may be desirable to pattern this conductive or metal backing sheet 63 in order to minimize or prevent cross-talk. One method of patterning the metal or conductive backing sheet 63 is simply to have the pixels patterned such that rows or columns are connected, but not the entire array. It is preferable that if the FEA pixel array is aligned along a "row", then the metal backing be patterned such that pixels in the same column are connected in parallel along the line of movement of the transfer sheet 50. Connecting the metal backing side of these capacitors to ground can then be accomplished at some distance away from the FEA. Note that in this configuration with a plurality of connected lines of pixels running along the line of movement of the pixelized transfer sheet 50, if the pixelized transfer sheet 50 is disposed in the configuration of a drum, then the lines will follow the circumference of the pixelized transfer sheet 50. Another configuration for reducing or avoiding cross-talk comprises connecting the individual pixels on the back plane by means of thin line connections, with the line connections being thin enough to add a sufficient resistance to minimize cross-talk.

Note that the photosensitive dielectric on top of a metal drum, as is commonly used in the Xerography process, evidences a very similar electrical structure, with the charged areas being separated from a ground plane by a thin, photoswitched, dielectric.

If the capacitance $C_3$ is relatively small, i.e. $<<0.05$ pF, then the voltage necessary to drive the requisite amount of charge from the FEA pixel 152 to the pixel electrode 170 increases (as noted earlier). This, in turn, means a higher voltage supply and higher voltage transistors throughout the circuit. The capacitance of just the metal pixel electrode 170 in free space can be approximated as the capacitance of two concentric spheres with the radius of the inner sphere, a, equal to the radius of the pixel electrode and the radius of the outer sphere b, much larger, $$C = 4\pi\epsilon_0 \frac{ab}{b-a} \rightarrow 4\pi\epsilon_0 a \cong 0.001 \text{ pF}$$

Such would be the case for a simple dielectric transfer sheet, or for any of the three transfer sheet configurations of FIGS. 5A, 5B, and 5C.

Figure 12:
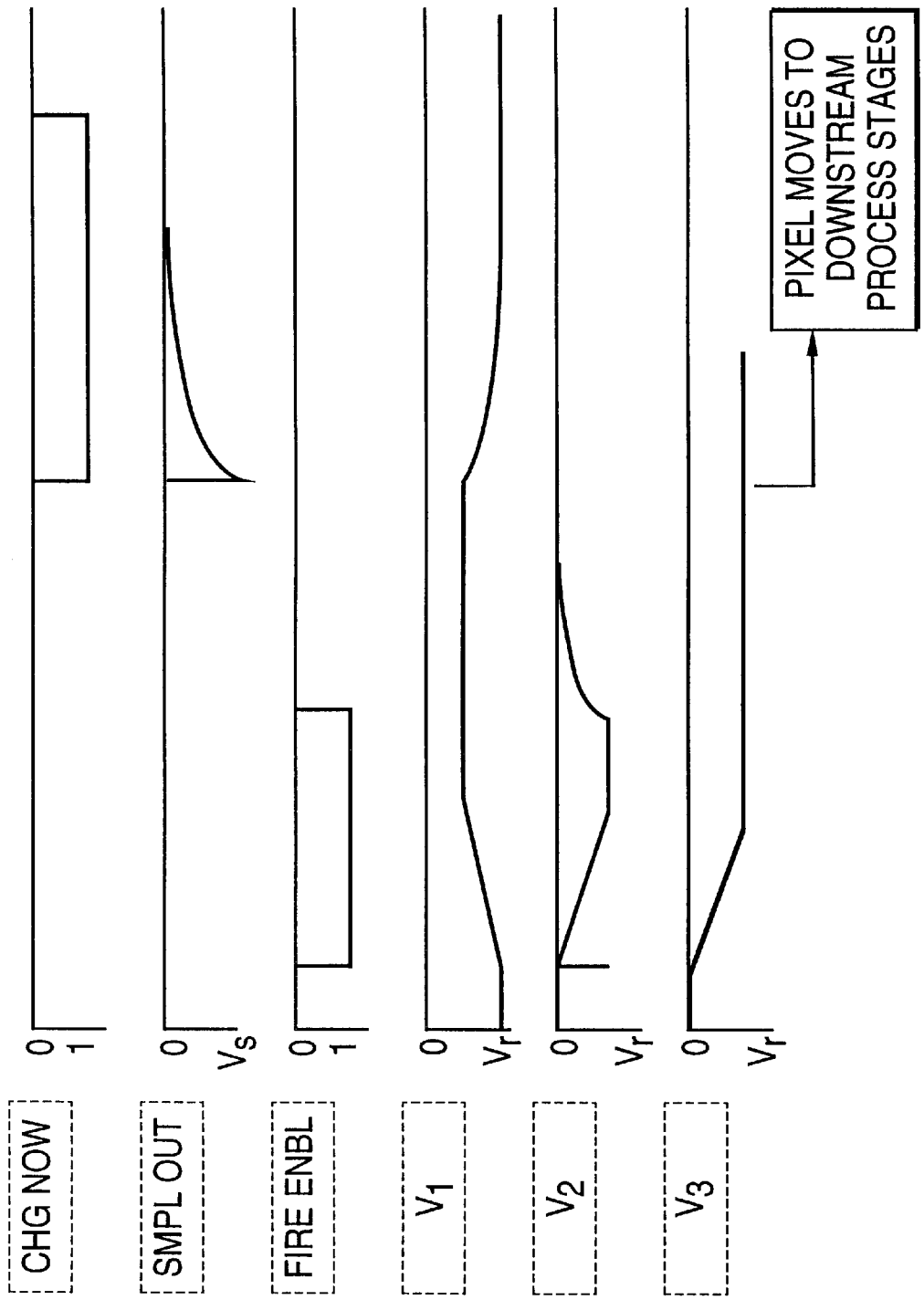
FIG. 12 is a voltage signal diagram illustrating the operation of the circuit of FIG. 11 in a printing mode.

Referring now to FIG. 12, there is shown one possible sequence of operations for FIG. 11 in a printing mode as illustrated by the signal diagrams shown in FIG. 12. It should be noted at the outset that the voltage level, $V_r$, represents the regulated voltage input level at terminal 153. The voltage level, $V_s$, represents the peak sampling voltage output level at the terminal 187. The voltage levels $V_r$ and $V_s$ are dependent on the details of the circuit parameters. The indicated operation sequence shown in FIG. 12 assumes the following for ease of fabrication:

$$C_1 \cong C_3 << C_2.$$

The sequence begins with a fire-enable signal on line 164 which closes the fire-enable switch 160. The charge on the storage capacitor 158 then begins to flow to FEA pixel 152. Accordingly, the voltage at the terminal 1 begins to rise while the voltage at the terminal 2 begins to drop. Note that there will be an initial transient on $V_2$ as the applied voltage increases to the point where the FEA 152 pixel-to-electrode 170 gap breaks down. After this breakdown point, the FEA 152 is essentially short-circuited to the opposite transfer sheet electrode 170. The charge transfer between the storage capacitor 158 ($C_1$) and the transfer sheet pixel 170 ($C_3$) is current-limited based on the forward impedance of the fire-enable transistor switch 164 in its "ON" state. The voltage $V_3$ for the terminal 3 has now dropped to its printing level.

Note that if $C_1 \cong C_3 = 0.033$ pF, then for $V_r = 30$V, $C_1$ functions to store a maximum of 1 pC, and the circuit of FIG. 11 transfers 15V and 0.5 pC to the capacitance $C_3$. This is a factor of two larger than the $\frac{5}{16}$ pC necessary if one is simply scaling charge density from 300 DPI to 1200 DPI.

After the firing of the FEA pixel 152, the charge-now switch 156 is closed to allow the charging current from the voltage source 150 to flow to charge the storage capacitance 158. As the current flows from the voltage source 150 to charge the storage capacitance 158, there will be a small voltage transient on the sample-out terminal 187 caused by a small amount of current flowing on the control terminal line 181. When the voltage on the sample out terminal 187 falls to zero, it is indicative that the storage capacitance 158 ($C_3$) has charged. Accordingly, the sample-out voltage signal at the terminal 187 could be utilized to control the charge-now switch 156 and to verify that printing is actually taking place.

Figure 13:
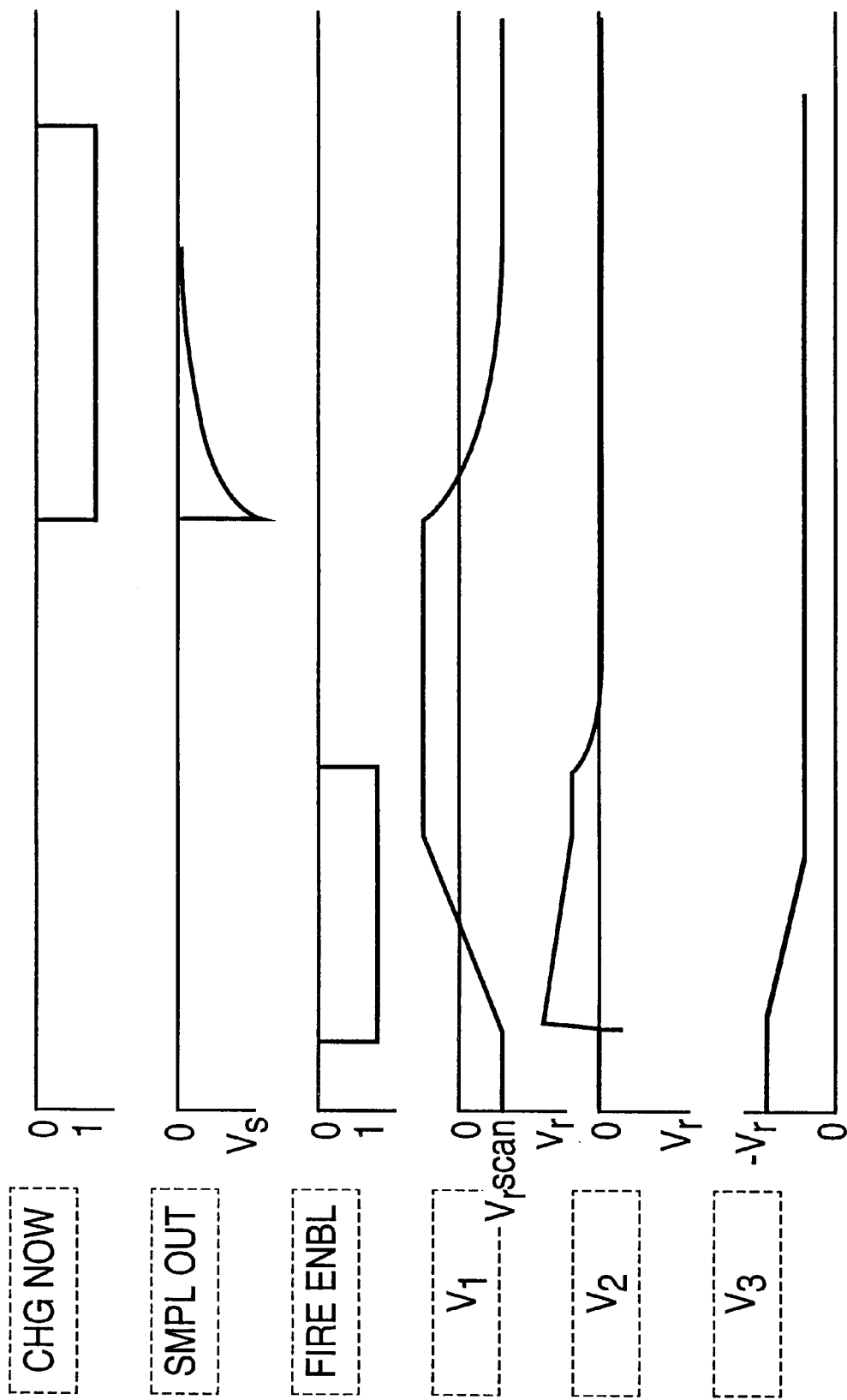
FIG. 13 is a voltage signal diagram illustrating the operation of the circuit of FIG. 11 in a scanning mode.

FIG. 13 shows a possible sequence of voltage operations for a scanning mode for the circuit of FIG. 11. Note that the only significant difference between FIG. 12 and FIG. 13 is in the level of $V_r$ scan and in the initial bias level on terminal 3 ($V_3$). For purposes of this figure, it has been assumed that $V_r$ scan=$V_r$/3 and that the initial bias level on $V_3$=$-2V_r$/3. It should be noted that maintaining $V_r$ scan<13V ensures that no electrical discharge is to occur on "neutralized" pixels on the charge transfer sheet.

During the scanning operation, the fire-enable switch 160 closes as a given transfer sheet pixel moves into adjacency with the FEA pixel 152. When the fire-enable switch closes (the voltage goes low), then the capacitance, $C_1$, is connected to the capacitance, $C_2$, for the FEA pixel 152. If the voltage difference ($V_2-V_3$) between the FEA pixel 152 and the transfer sheet electrode 170 is sufficient to cause an electrical discharge, then there will be a charge flow to the FEA pixel 152. The transient on the $V_2$ waveform is the initial negative-going pulse that is necessary to establish the electrical discharge. When the electrical discharge occurs, $V_2$ and $V_3$ are effectively shorted to each other and $V_2$ essentially tracks $V_3$. (Note that if $C_3$ is not sufficiently charged to provide a voltage difference for an electrical discharge, then no charge flow to the FEA pixel 152 will occur.) When the voltages on $C_1$ and $C_3$ have substantially equilibrated, charge is no longer flowing from $C_1$ (capacitance 158) to $C_3$, and the discharge is extinguished. When the fire-enable switch 160 opens, then $V_1$ and $V_2$ are no longer connected. At this point, the electrical discharge will have already stopped. The voltage $V_2$ then decays.

At this point in the sequence, it is necessary to recharge $C_1$, and, at the same time, sample $C_1$ to determine how much charge flowed. Accordingly, the charge-now switch 156 is closed to begin recharging $C_1$. At the same time, a voltage transient occurs at the sample-out terminal 187 caused by a limited amount of charge flowing on line 181 to the control terminal of the sample-out switch 182. This transient represents the derivative of the charge-now current flowing to $C_1$. The occurrence of this transient can be detected at the terminal 187 simply with a discriminator circuit, which will yield a binary output based on the voltage level at terminal 187. Alternatively, a measurement of the charge flowing to $C_1$ through the charge-now switch can be made by integrating the voltage signal on terminal 187. Such an integration may be accomplished using a standard RC integrating circuit 189 connected to terminal 187 of the sample-out switch 182. Accordingly, a gray scale sampling signal may be obtained.

It should be noted that the scanning function for the devices shown in FIG. 7 and FIG. 8 is able to run at the same basic rate as the printing function. Accounting for an 11-inch wide feed path, at 1200 DPI, the pixel spacing may be 25,400/1200=21.2 $\mu$m, so that at two 8/12 inch wide pages per second, @ 1200 DPI=20,400 pixel rows/second for a time interval of approximately 50 $\mu$sec./pixel row; for an 11 inch long page, the number of pixels/row=13,200. This signal processing for the individual pixels is preferably done in parallel.

Figure 9:
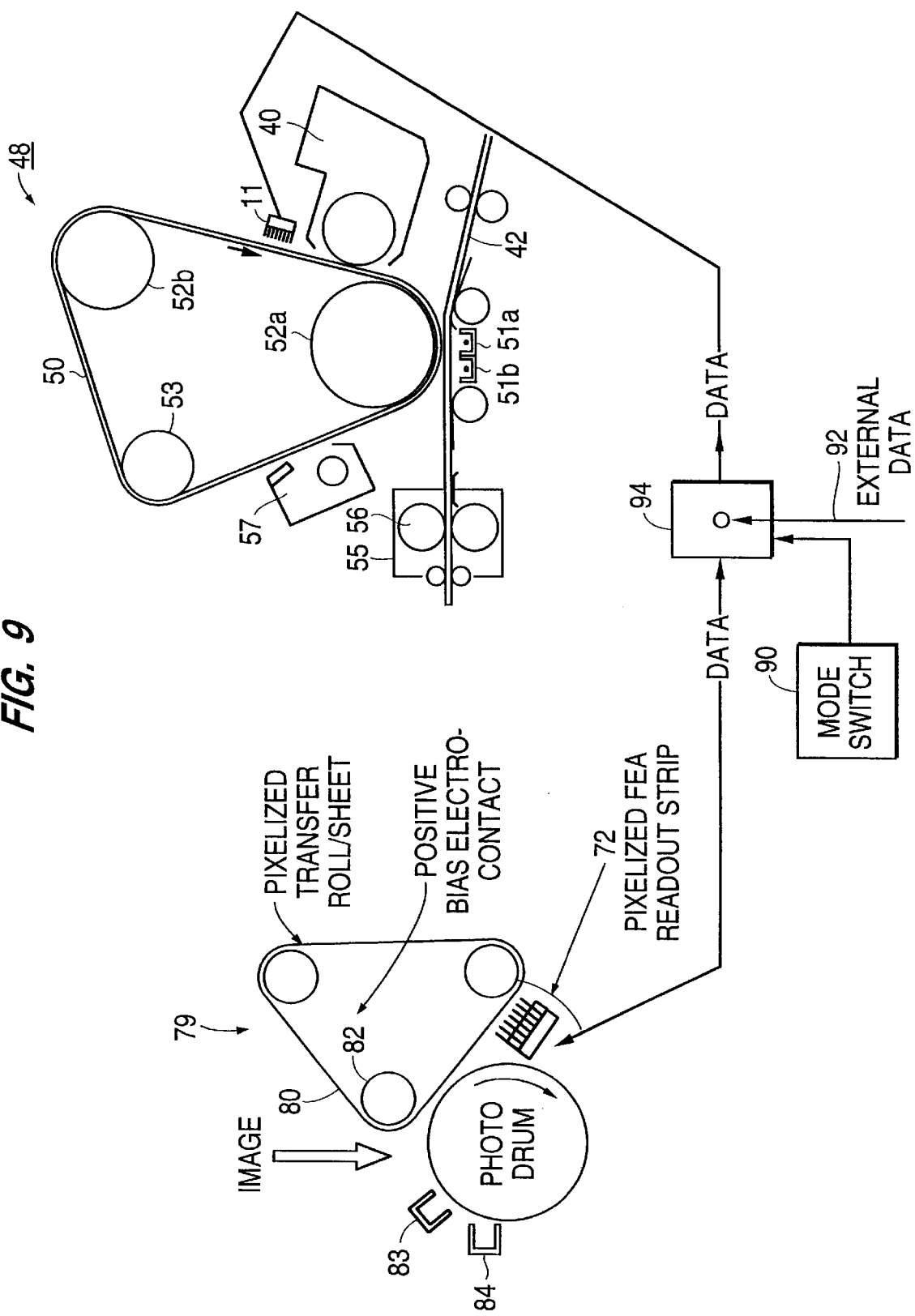
FIG. 9 is a schematic diagram illustrating a system that includes a copying function, a printing function and a scanning function in accordance with the present invention.

Various combinations of the charge distribution sensing device and the device for creating a pattern charge distribution may be made. For example, one combination of particular advantage is to pair a scanning unit 48 with a printing unit 79. This configuration has the advantage that it can perform copying, printing, and scanning. It separates the image collection function from the image printing function so that the photoconductive drum 70 and the scanning FEA array 72 can be physically segregated from the toner dispenser, thereby preventing contamination thereof by the toner. These separate functions allow a copier to process the image with various data filters before the image is reprinted. This system configuration is shown in FIG. 9. The system configuration allows the copier to accept images and to place them in a holding queue in a standard processor 94 while the printer finishes a previous print job. The configuration also allows the copier function to accept images and then interleave those images with other data prior to being sent to the print queue. In this configuration shown in FIG. 9, a mode switch 90 may be included to switch the operation between scanning, printing, and copying functions. Likewise, external data may be applied on line 92 into the processor 94 to facilitate online printing.

The various embodiments of the present invention should provide significant advantage in the printing, copying, and scanning arts. Specifically, the scanning embodiment of the present invention can be thought of as an addition to a high-speed Xerographic photocopier. However, instead of depositing and fusing toner, the field emitter array is used to sample the charge on the photoconductive drum and convert it to high-resolution digital data. When the printer embodiment of the present invention is utilized, the device may replace the optical scanning component of a Xerographic photocopier, using the field emitter array to place charge on the drum. In essence, the present invention prints with charge, not light. The image is converted directly to an electrostatic image. In a digital embodiment, this would result in a direct bit-image transfer to an electrostatic image. The toner/fuser process is then used to transfer the intended image to paper.

As noted above, the present invention can combine both the scanner embodiment and the printer embodiment to form a stand-alone printer, scanner, and copier.

In a yet further embodiment of the present invention, a single field emitter array strip may be utilized for both the printing and the scanning function. This configuration comprises a surface for receiving and storing charge in a two-dimensional pattern thereon. The system further include an ungated linear array of field emitters that is pixelized with a linear array of pixel contacts connected thereto so that each contact energizes a different set of field emitters in the linear array of field emitters. The system further includes means for creating relative closely-proximate movement between the linear array of field emitters and the surface. The system also includes a driver circuit for operation in a first mode to apply voltage at or above the voltage necessary to drive an electrical discharge for the field emitters to selected ones of the pixel contacts as the surface and the linear array move relative to one another to cause charge to be deposited on the surface in the shape of a first two-dimensional pattern. Additionally, the system includes a sampling circuit for operation in a second mode for sampling the linear array of field emitters during the relative movement between the linear array of field emitters and the surface so that a second two-dimensional charge pattern stored on the surface is sampled and a sampling signal is generated that is representative thereof. Also, the system includes a storage device operating in the second mode for storing the sampling signal that is representative of a second two-dimensional charge pattern, and a switch for switching the system operation between the first mode and the second mode. The driving and sampling circuit of FIG. 12 would be used to implement this configuration. Note that in this configuration, when the surface is used for both printing and scanning, then the bias applied to the surface will need to be changed to an optimum level for the mode chosen. For example, if a transfer sheet is utilized as the surface, then the bias voltage applied to the transfer sheet pixels could be shifted between approximately ground voltage in the printing mode, to some positive voltage, such as, for example, about 15 volts, for the scanning mode. This voltage shifting could be accomplished simply by a switch connected to two different voltage sources.

It should be noted that the present configuration is printing by means of charge, not light. Accordingly, the present configuration does not include a light sensitive drum but rather uses a chargeable sheet.

It should be noted that the present inventive configurations may be particularly useful in the graphics art market where short-run high-quality printing is required.

It should also be noted that the particular problem of non-uniform charging can be solved when pixelized transfer sheets are utilized. Specifically, the pixelization of the transfer sheet allows very precise control of the size of the pixel and thus the amount of charge that is retained on the pixel.

It should be noted that with the present inventive configuration, four-color scanning can be implemented simply by using a filter wheel, and four-color printing may be implemented simply by utilizing four separate printer devices.

A particular advantage to the present invention is that an ungated field emitter array is utilized with an open emitter configuration that can be operated without a vacuum. This is made possible by the scale size of approximately 5–20 microns spacing from the FEA array tips to the transfer surface in combination with the highly featured configuration of emitter tips. It should be noted that the field enhancement factor attendant to the 5–20 micron spacing and the highly featured emitter surface will effect a volumetric electrical discharge rather than a point to point spark. Specifically, the emitters of the FEA are initially unbiased and "off." When the control signal to turn the FEA emitters "on" is applied, the negative voltage on the FEA emitters will rapidly rise from zero toward its full "on" value. At an intermediate value, the voltage on the FEA emitters will exceed the value necessary to either drive field emission from or form corona on the tips. This initial ionization effectively "seeds" the volume between the FEA tips and the transfer surface. As the full "on" voltage is achieved on the tips, this seeding allows a volumetric discharge to occur. This latter volumetric discharge is also sometimes referred to as a Townsend discharge or "dark" discharge. This design intentionally minimizes the possibility of a point to point spark discharge that would damage the emitter tips and the transfer surface, and that would result in limited equipment lifetime.

Obviously, many modifications and variations of the present invention are possible in light of the above teachings. It is therefore to be understood that within the scope of the appended claims, the invention may be practiced otherwise than as specifically described.

What is claimed is:

1. A pattern transfer device, comprising:
   at least one pixel for receiving and storing charge;
   an electrode contact integral to said pixel;
   an ungated field emitter array for depositing charge on said pixel in accordance with a control signal; and
   a driver circuit for driving said field emitter array to cause an electrical discharge across a gap between said field emitter array and said at least one pixel in accordance with said control signal.

2. A pattern transfer device as defined in claim 1, wherein said field emitter array is operated at about atmospheric pressure.

3. A pattern transfer device as defined in claim 1, wherein said field emitter array comprises a semiconductor-metal composite microstructure including an array of rod-like tips protruding from a top surface of a semiconductor substrate.

4. A pattern transfer device as defined in claim 3, wherein said rod-like tips are tantalum disilicide and said semiconductor substrate is silicon.

5. A pattern transfer device as defined in claim 1, wherein said field emitter array comprises a linear array of field emitter material.

6. A pattern transfer device as defined in claim 5, wherein said pixel comprises a pixelized transfer sheet, with each of said pixels comprising a conductive area surrounded by insulating area.

7. A pattern transfer device as defined in claim 5, wherein said pixel comprises a drum.

8. A pattern transfer device as defined in claim 5, wherein said pixel, comprises a plurality of pixels disposed on a first surface of a sheet, with each of said pixels disposed on said first surface comprising a conductive area surrounded by insulating area, and with each metal area electrically connected to a respective aligned metal area on an opposite surface of said sheet.

9. A device as defined in claim 8, wherein said sheet is in the form of a drum.

10. A device as defined in claim 3, wherein the spacing between adjacent rod-like tips is greater than the spacing between the ends of said rod-like tips and said pixel.

11. A pattern transfer technique, comprising the steps of:
    energizing a gap between an ungated field emitter array and an electrode pixel at a voltage to cause an electrical discharge across said gap in accordance with a control signal to cause said field emitter array to emit electrons; and
    receiving and storing said electrons at said pixel.

12. A pattern transfer technique as defined in claim 11, wherein said step of energizing said gap comprises creating a corona discharge at said field emitter array, followed by a volumetric discharge across said gap.

13. A pattern transfer technique as defined in claim 12, wherein said energizing step comprises the step of energizing said ungated field emitter array at about atmospheric pressure.

14. A pattern transfer technique as defined in claim 11, wherein said energizing step comprises the step of energizing a field emitter array having a semiconductor-metal composite microstructure including an array of rod-like tips protruding from a top surface of a semiconductor substrate.

15. A pattern transfer technique as defined in claim 11, wherein said energizing step comprises the step of energizing a field emitter array having a semiconductor-metal composite microstructure including an array of rod-like tips of tantalum disilicide protruding from a top surface of a silicon substrate.

16. A pattern transfer technique as defined in claim 11, whereas said receiving and storing step comprises the step of receiving and storing electrons on a pixelized transfer sheet; and
    wherein said energizing step comprises the step of energizing a linear array of field emitters.

17. A pattern transfer technique as defined in claim 16, wherein said energizing step comprises the step of driving a linear array of pixelized field emitters in accordance with said control signal.

18. A device for creating a patterned charge distribution, comprising:
    a surface for receiving and storing charge in a two-dimensional pattern thereon;
    an ungated linear array of field emitters that is pixelized with a linear array of pixel contacts connected thereto so that each contact energizes a different set of field emitters in said linear array of field emitters;
    means for creating relative closely-proximate movement between said linear array of field emitters and said surface so that said two-dimensional pattern is scanned; and
    a driver circuit for applying voltage, to cause an electrical discharge across a gap between said field emitters and said surface, to selected ones of said pixel contacts as said surface and said linear array move relative to one another to thereby cause charge to be deposited on said surface in the shape of said two-dimensional pattern.

19. A device as defined in claim 18, wherein said surface comprises a drum with an outer surface that is pixelized, wherein said surface comprises a pixelized sheet, with each of said pixels comprising a conductive area surrounded by insulating area.

20. A device as defined in claim 18, wherein said surface comprises a pixelized sheet, with each of said pixels comprising a conductive area Surrounded by insulating area.

21. A device as defined in claim 18, wherein said surface is both charge-sensitive and photosensitive; and further comprising
    a toner dispenser for depositing toner onto said surface in accordance with said two-dimensional pattern of deposited charge; and
    means for bringing a material to be printed into contact with said surface to convert said two-dimensional toner pattern to a visible image on said material.

22. A device as defined in claim 18, wherein said surface is pixelized, with each pixel comprising a conductive area surrounded by insulating area; and further comprising a toner dispenser for depositing toner onto said surface so that said toner is retained on said surface in accordance with said two-dimensional pattern of charge deposited thereon; and means for bringing a material to be printed into contact with said two-dimensional pattern of toner on said surface to transfer said two-dimensional pattern onto said material.

23. A device as defined in claim 22, wherein said surface is pixelized at the same areal resolution as said pixelized linear array of field emitters.

24. A device as defined in claim 22, wherein said conductive area in each pixel is metal.

25. A device as defined in claim 24, wherein said metal areas on said one surface of said sheet are electrically connected to aligned metal areas on an opposite surface of said sheet.

26. A device as defined in claim 25, wherein said sheet is in the form of a drum.

27. A device as defined in claim 20, wherein said conductive areas on said one surface of said sheet are electrically connected to aligned metal areas on an opposite surface of said sheet.

28. A device as defined in claim 18, wherein said array of field emitters comprises an array of rod-like tips of tantalum disilicide protruding from a top surface of a silicon substrate.

29. A device as defined in claim 28, wherein said array of field emitters is disposed in a housing at about atmospheric pressure.

30. A device as defined in claim 18, wherein said means for creating relative movement moves said surface across said linear array of field emitters.

31. A device as defined in claim 18, wherein said driver circuit comprises:

a storage capacitance, $C_1$, and a fire-enable switch for each field emitter pixel contact to be charged, for charging their respective field emitter pixel through said fire-enable switch in accordance with a control signal applied to said fire-enable switch.

32. A device as defined in claim 31, wherein said surface has a capacitance, $C_3$, to ground at a value on the order of 0.005 pF to 0.5 pF; and wherein said driver circuit applies a voltage to said pixel contacts on the order of 25–90 volts.

33. A device as defined in claim 32, wherein said driver circuit storage capacitance, $C_1$, and the capacitance of said surface, $C_3$, and an intrinsic capacitance, $C_2$, between said pixelized field emitters and said surface, have the following relationship $$C_1 \cong C_3 >> C_2.$$

34. A device as defined in claim 18, wherein said driver circuit storage capacitance, $C_1$, and the capacitance of said surface, $C_3$, and an intrinsic capacitance, $C_2$, between said pixelized field emitters and said surface, have the following relationship $$C_1 \cong C_3 >> C_2.$$

35. A method for creating a patterned charge distribution comprising the steps of:

driving, over a period of time, selected pixels in an ungated pixelized linear array of field emitters with voltages to cause electrical discharges across a gap between said field emitters and a surface capable of receiving and storing a two-dimensional charge pattern, so that said field emitters emit electrons to form a two-dimensional pattern on said surface; and creating closely-proximate relative movement between said linear array of field emitters said surface so that said two-dimensional pattern from said linear array of field emitters is scanned across said surface and said surface receives a deposition of electrons in the shape of said two-dimensional pattern.

36. A method as defined in claim 35, wherein said moving a surface step comprises the step of moving a surface which is photosensitive and charge-sensitive; and further comprising the steps of dispensing a toner onto said surface in accordance with said two-dimensional pattern; and bringing a material to be printed into contact with said surface to convert said two-dimensional pattern to a visible image on said material.

37. A method as defined in claim 36, further comprising the step of illuminating said photosensitive surface after printing in order to clean the deposited charge from said surface.

38. A method as defined in claim 35, wherein said moving step comprises the step of moving a pixelized surface across said pixelized linear array of field emitters, with each pixel in said pixelized surface comprising a conductive area surrounded by insulating area;

depositing toner onto said pixelized surface so that said toner is retained on said surface in accordance with said two-dimensional pattern of charge deposited thereon; and bringing a material to be printed into contact with said two-dimensional pattern of toner on said pixelized surface to transfer said pattern onto said material.

39. A method as defined in claim 35, wherein said creating relative movement step comprises the step of moving said surface across said linear array of field emitter.

40. A method as defined in claim 35, wherein said driving step comprises the step of applying a voltage to said pixels in said pixelized linear array on the order of about 25–90 volts.

41. A method as defined in claim 35, further comprising the step of maintaining a capacitance, $C_3$, between said surface and ground at a value of the order of 0.3 pF.

42. A method as defined in claim 35, further comprising the step of maintaining a capacitance value, $C_1$, in said driving step, and a capacitance, $C_3$, between said surface and ground, and an intrinsic capacitance, $C_2$, between said pixels of said pixelized linear array of field emitters and said surface, in the following relationship $$C_1 \cong C_3 >> C_2.$$

43. A method as defined in claim 38, further comprising the step of applying a voltage bias to a plurality of the individual pixels on said pixelized surface.

44. A method as defined in claim 43, wherein said step of applying said voltage bias to said individual pixels on said pixelized surface comprises the step of applying said voltage bias to a side of said surface that is opposite to the side that receives the deposition of electrons.

45. A device for sensing charge distribution on a surface comprising:

a photostatic surface for storing a two-dimensional charge pattern;

a biased linear array of field emitters;

means for creating relative closely-proximate movement between said linear array of field emitters and said two-dimensional pattern; and a sampling circuit for sampling said linear array of field emitters during said relative movement between said linear array of field emitters and said two-dimensional pattern so that said two-dimensional pattern is effectively sampled and a sampling signal is generated that is representative thereof.

46. A device as defined in claim 45, further comprising:
a storage device for storing said sampling signal that is representative of said two-dimensional charge pattern.

47. A device as defined in claim 45, wherein said field emitters in said linear array are ungated and are biased by said sampling circuit so that the two-dimensional charge pattern causes selected field emitters to emit electrons in an electrical discharge during the sampling process.

48. A device as defined in claim 47, wherein said linear array of field emitters are pixelized with a linear array of pixel contacts connected thereto so that each contact connects to a different set of field emitters in said linear array of field emitters.

49. A device as defined in claim 48, further comprising a conversion circuit for converting said sampling signal into digital data and then providing said digital data to said storage device.

50. A device as defined in claim 45, wherein said photostatic surface comprises a drum.

51. A device as defined in claim 45, wherein said linear array of field emitters comprises an array of rod-like tips of tantalum disilicide protruding from a top surface of a silicon substrate.

52. A device as defined in claim 51, wherein said linear array of field emitters is disposed in a housing at about atmosphere pressure.

53. A device as defined in claim 45, wherein said means for creating relative movement comprises means for creating relative closely-proximate movement between said linear array of field emitters and said photostatic surface.

54. A device as defined in claim 45, wherein said means for creating relative movement comprises:
a transfer sheet disposed relative to said photostatic surface for replicating said two-dimensional pattern thereon;
means for transferring said two-dimensional pattern from said photostatic surface to said transfer sheet; and
means for creating relative closely-proximate movement between said linear array of field emitters and said two-dimensional pattern on said transfer sheet.

55. A device as defined in claim 54, further comprising an adjustment circuit for adjusting the voltage bias of said transfer sheet.

56. A device as defined in claim 54, wherein said transfer sheet is pixelized, with each pixel comprising a conductive area surrounded by insulating material.

57. A device as defined in claim 56, wherein said pixelized transfer sheet comprises a sheet with pixels on one surface thereof, said conductive area in each pixel being electrically connected to aligned conductive areas on an opposite surface of said sheet.

58. A device as defined in claim 57, further comprising an adjustment circuit for adjusting a voltage bias on said conductive areas in said pixels in said transfer sheet.

59. A device as defined in claim 56, wherein said array of field emitters are pixelized with a linear array of pixel contacts connected thereto so that each contact connects to a different set of field emitters in said linear array of field emitters; and wherein said sampling circuit comprises a capacitance, $C_1$, for each of said field emitter pixel contacts; and wherein a capacitive value, $C_3$, between said transfer sheet pixels and ground and the intrinsic capacitance, $C_2$, between said pixelized field emitters and said transfer sheet has the following relationship $$C_1 \cong C_3 >> C_2.$$

60. A device as defined in claim 45, wherein said means for creating relative movement moves said photostatic surface across said linear array of field emitters.

61. A device as defined in claim 48, wherein said sampling circuit comprises:
a storage capacitance, $C_1$, for each pixel of field emitters, connected to said pixel contact for said pixel;
a fire-enable switch for each capacitance, $C_1$, for connecting said capacitance, $C_1$, to the pixel contact for its respective pixel of field emitters in accordance with a control signal;
a charging circuit for recharging said capacitance, $C_1$, with a charging current at a time after said fire-enable switch has opened the connection between said capacitance, $C_1$, and said pixel contact; and
a sampling device for sampling said charging activity.

62. A device as defined in claim 61, further comprising means connected to said sampling device for obtaining a relative measurement of said charging current.

63. A device as defined in claim 62, wherein said means for obtaining a relative measurement comprises an integrating circuit.

64. A device as defined in claim 61, further comprising a discriminator connected to said sampling device for generating a binary value based on the operation of said sampling device.

65. A device for sensing charge distribution on a surface comprising:
a pixelized surface, with said pixels on said surface capable of storing a two-dimensional charge pattern;
a biased linear array of field emitters disposed across said pixelized surface for sampling the charge on said surface and generating a sampling signal in response thereto;
means for creating relative closely-proximate movement between said linear array of field emitters and said pixelized surface; and
a sampling circuit for sampling said linear array of field emitters during said relative movement between said linear array of field emitters and said surface so that a two-dimensional charge pattern stored on said pixelized surface is sampled and a sampling signal generated that is representative thereof.

66. A device as defined in claim 65, further comprising:
a storage device for storing said sampling signal that is representative of said two-dimensional pattern.

67. A device as defined in claim 65, wherein said field emitters in said linear array are ungated and are biased by said sampling circuit so that the two-dimensional charge pattern causes selected field emitters to emit electrons in an electrical discharge during the sampling process.

68. A device as defined in claim 67, wherein said linear array of field emitters are pixelized with a linear array of pixel contacts connected thereto so that each contact connects to a different set of field emitters in said linear array of field emitters.

69. A device as defined in claim 67, further comprising a conversion circuit for converting said sampling signal into digital data and then providing said digital data to said storage device.

70. A device as defined in claim 65, wherein said pixelized surface is disposed in the shape of a drum.

71. A device as defined in claim 65, wherein said linear array of field emitters comprises an array of rod-like tips of tantalum disilicide protruding from a top surface of a silicon substrate.

72. A device as defined in claim 67, wherein said linear array of field emitters comprises an array of rod-like tips of tantalum disilicide protruding from a top surface of a silicon substrate.

73. A device as defined in claim 65, wherein said sampling circuit comprises a storage capacitance, $C_1$, for each of a plurality of field emitter pixels, said storage capacitance connected to said pixel contact for its respective field emitter pixel;

a fire-enable switch for each capacitance, $C_1$, for connecting said capacitance, $C_1$, to the pixel contact for its respective pixel of field emitters in accordance with a control signal;

a charging circuit for recharging said capacitance, $C_1$, with a charging current at a time after said fire enable switch has opened the connection between said capacitance, $C_1$, and said pixel contact; and a sampling device for sampling said charging current.

74. A device as defined in claim 73, further comprising means connected to said sampling device for obtaining a relative measurement of said charging current.

75. A device as defined in claim 73, further comprising a discriminator connected to said sampling device for generating a binary value based on the operation of said sampling device.

76. A device as defined in claim 65, wherein each pixel in said pixelized surface has a capacitance, $C_3$, to ground at a value on the order of 0.005 pF to 0.5 pF.

77. A device as defined in claim 65, wherein said means for creating relative movement: moves said pixelized surface across said linear array of field emitters.

78. A method for sensing charge distribution on a surface, comprising the steps of:

storing a two-dimensional charge pattern on a photostatic surface;

creating relative closely-proximate movement between a biased linear array of field emitters and said two-dimensional pattern; and sampling said linear array of field emitters during said relative movement between said linear array of field emitters and said two-dimensional pattern so that said two-dimensional pattern is effectively sampled and a sampling signal is generated that is representative thereof.

79. A method as defined in claim 78, further comprising the step of:

storing said sampling signal that is representative of said two-dimensional charge pattern.

80. A method as defined in claim 78, wherein said sampling step comprises the step of biasing ungated pixelized field emitters so that the two-dimensional charge pattern causes selected field emitters to achieve an electrical discharge during said sampling.

81. A method as defined in claim 80, wherein said step of creating relative movement comprises the steps of:

disposing a transfer sheet relative to said photostatic surface for replicating said two-dimensional pattern thereon;

transferring the two-dimensional pattern from said photostatic surface to said transfer sheet; and creating relative closely-proximate movement between said linear array of field emitters and said two-dimensional pattern on transfer sheet.

82. A method as defined in claim 80 wherein said method is performed at about atmospheric pressure.

83. A method as defined in claim 80, wherein said sampling step comprises the steps of connecting a respective capacitance, $C_1$, to each of said field emitter pixels in accordance with a control signal;

after the connection between the capacitance, $C_1$, and its respective field emitter pixel has been broken, recharging said capacitance, $C_1$, with a charging current; and sampling the charging current.

84. A method as defined in claim 83, further comprising the step of obtaining a relative measurement of said charging current.

85. A method as defined in claim 83, further comprising the step of generating a binary value based on the value of said charging current.

86. A method for sensing charge distribution on a surface, comprising the steps of:

storing a two-dimensional charge pattern on a pixelized surface; and creating relative closely-proximate movement between a linear array of field emitters and said pixelized surface; and sampling said linear array of field emitters during said relative movement between said linear array of field emitters and said surface so that a two-dimensional charge pattern stored on said pixelized surface is sampled and a sampling signal is generated that is representative thereof.

87. A method as defined in claim 86, further comprising the step of:

storing said sampling signal that is representative of said two-dimensional pattern.

88. A method as defined in claim 83, wherein said sampling step comprises the step of biasing ungated pixelized field emitters to achieve an electrical discharge during said sampling.

89. A method as defined in claim 88, wherein said sampling step comprises the steps of connecting a capacitance, $C_1$, to each of a plurality of field emitter pixels in accordance with a control signal;

after the connection between the capacitance, $C_1$, and a field emitter pixel has been broken, recharging said capacitance, $C_1$ with a charging current; and sampling the charging current.

90. A method as defined in claim 89, further comprising the step of obtaining a relative measurement of said charging current.

91. A method as defined in claim 89, further comprising the step of generating a binary value based on the value of said charging current.

92. A method as defined in claim 86, wherein a capacitance, $C_3$, to ground for each pixel on said pixelized surface is maintained at a value on the order of about 0.005 pF to 0.5 pF.

93. A device for sensing charge distribution on a surface, comprising:

a photostatic surface for storing a two-dimensional charge pattern;

a pixelized transfer sheet:, with each pixel comprising a metal dot surrounded by insulating material;

means for transferring said two-dimensional pattern on said photostatic surface to said transfer sheet;

a pixelized linear array of biased field emitters;

means for having said two-dimensional pattern on said transfer sheet scanned across said linear array of field emitters;

a sampling circuit for sampling said linear array of field emitters during said two-dimensional pattern scanning so that said two-dimensional pattern is sampled and a sampling signal is generated that is representative thereof; and a storage device for storing said sampling signal that is representative of said two-dimensional pattern.

94. A device as defined in claim 93, wherein said linear array comprises a linear array of ungated field emitters; and wherein said sampling circuit biases said field emitters of said linear array so that the two-dimensional charge pattern causes selected field emitters to emit electrons in an electrical discharge during the sampling process.

95. A device as defined in claim 94, wherein said linear array of field emitters comprises an array of rod-like tips of tantalum disilicide protruding from a top surface of a silicon substrate disposed in a housing at atmosphere pressure.

96. A device as defined in claim 94, wherein said sampling circuit comprises a storage capacitance, $C_1$, for each pixel of field emitters, connected to said pixel contact for said pixel;

a fire-enable switch for each capacitance, $C_1$, for connecting said capacitance, $C_1$, to the pixel contact for its respective pixel of field emitters in accordance with a control signal;

a charging circuit for recharging said capacitance, $C_1$, with a charging current at a time after said fire-enable switch has opened the connection between said capacitance, $C_1$, and said pixel contact; and a sampling device for sampling said charging current.

97. A unitary system comprising:

a first surface for receiving and storing thereon charge representing a first two-dimensional pattern;

an ungated first linear array of field emitters that is pixelized with a linear array of pixel contacts connected thereto so that each contact energizes a different set of field emitters in said first linear array of field emitters;

first means for creating relative closely-proximate movement between said first linear array of field emitters and said first surface;

a first driver circuit for applying voltages, to cause electrical discharge across a gap between said field emitters and said first surface, to selected ones of said pixel contacts as said surface and said linear array move relative to one another to cause charge to be deposited on said surface in the shape of said first two-dimensional pattern;

a second surface for receiving and storing a second two-dimensional pattern thereon;

a biased second linear array of field emitters;

second means for creating relative closely-proximate movement between said second linear array of field emitters and said second two-dimensional pattern;

a sampling circuit for sampling said second linear array of field emitters during said relative movement between said second linear array of field emitters and said second two-dimensional pattern so that said second two-dimensional pattern is sampled and a sampling signal generated that is representative thereof; and a storage device for storing said sampling signal that is representative of said second two-dimensional pattern.

98. A system comprising:

a surface for receiving and storing charge in a two-dimensional pattern thereon;

an ungated linear array of field emitters that is pixelized with a linear array of pixel contacts connected thereto so that each contact energizes a different set of field emitters in said linear array of field emitters;

means for creating relative closely-proximate movement between said linear array of field emitters and said surface;

a driver circuit for operation in a first mode to apply voltage, to cause electrical discharges across a gap between said field emitters and said surface, to selected ones of said pixel contacts as said surface and said linear array move relative to one another to cause charge to be deposited on said surface in the shape of a first two-dimensional pattern;

a sampling circuit for operation in a second mode for sampling said linear array of field emitters during said relative movement between said linear array of field emitters and said surface so that a second two-dimensional charge pattern stored on said surface is sampled and a sampling signal is generated that is representative thereof;

a storage device operational in said second mode for storing said sampling signal that is representative of said second two-dimensional charge pattern; and a switch for switching system operation between said first mode and said second mode.

99. A system as defined in claim 98, wherein said linear array of field emitters comprises an array of rod-like tips of tantalum disilicide protruding from a top surface of a silicon substrate disposed in a housing at atmosphere pressure.

100. A circuit for driving or sampling an ungated field emitter array pixel comprising:

an ungated field emitter pixel;

a first capacitance;

an enabling switch with a first and second terminals, with said first terminal connected to said field emitter pixel, and with said second terminal connected to said first capacitance;

a charge source;

a charging switch with a first and second terminals, said charging switch being connected at its first terminal to said charge source;

a first resistive element with a first and second terminals, said first resistive element being connected at its first terminal to the second terminal of said charging switch, said first resistive element being connected at its second terminal to the second terminal of said enabling switch;

a transistor with its control terminal connected to the second terminal of said charging switch; and a second resistive element connected at one terminal to the second terminal of said first resistive element and at its other terminal to a second terminal of said transistor.

101. A circuit as defined in claim 100, wherein said circuit is integrated directly onto a backplane of said ungated field emitter pixel.

102. A pixelized transfer sheet comprising:

a flexible non-conductive sheet with a front and back surfaces and a plurality of via holes in said sheet forming connecting passages between said front and back surfaces, said sheet having a direction of relative movement;

conductive area formed on the front surface of said sheet over each of said plurality of vias;

conductive material disposed in said via holes to form a conductive path between said conductive area on said front surface and said back surface of said sheet;

a conductive area formed on said back surface at least to cover said via holes with said conductive material therein;

an insulating material deposited over said conductive areas on said back surface at least to cover said conductive areas; and a conductive backing disposed on said back surface to cover at least said insulating material.

103. A pixelized transfer sheet as defined in claim 102, wherein said conductive backing comprises a single continuous conductive backing sheet covering the insulating layer.

104. A pixelized transfer sheet as defined in claim 102, wherein said conductive backing is formed in conductive strips over the insulating layer and disposed over a line of vias running in the direction of relative movement of said sheet.

105. A pixelized transfer sheet as defined in claim 102, wherein said conductive backing comprises a conductive area disposed over the insulating material above each of said vias at said back surface of said sheet, with each of the conductive areas on the back surface being connected to adjacent conductive areas on said back surface by thin conductive lines with a high enough resistance to minimize cross-talk between conductive areas.

106. A pixelized transfer sheet as defined in claim 105, wherein said insulating material is alumina.

* * * * *